United States Patent
Watanabe et al.

(10) Patent No.: US 6,510,110 B2
(45) Date of Patent: Jan. 21, 2003

(54) DISK CARRYING APPARATUS AND DISK CARRYING METHOD INVOLVING DETERMINING OPTIMUM STOP POSITION OF DISK CARRIER BASED ON DETECTED STOPPING STATE OF DISK CARRIER

(75) Inventors: Taro Watanabe, Chiba (JP); Yuji Uchiyama, Tokyo (JP); Masatsugu Iribe, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/760,348

(22) Filed: Jan. 12, 2001

(65) Prior Publication Data

US 2001/0030913 A1 Oct. 18, 2001

(30) Foreign Application Priority Data

Jan. 18, 2000 (JP) ........................................ 2000-008712

(51) Int. Cl.$^7$ .............................................. G11B 17/22
(52) U.S. Cl. ................................ 369/30.32; 369/34.01; 369/30.53; 369/30.55
(58) Field of Search ............................. 369/30.32, 30.8, 369/30.39, 30.29, 30.86, 30.88, 30.85, 30.313, 13.17, 75.1, 30.76, 30.28, 30.27, 34.01, 30.53, 30.55; 360/92, 98.01, 98.04, 98.5

(56) References Cited

U.S. PATENT DOCUMENTS

| | | |
|---|---|---|
| 3,671,748 A | 6/1972 | Friedman |
| 4,731,682 A | 3/1988 | Nishiyama et al. |
| 4,807,208 A | 2/1989 | Geiger |
| 5,248,888 A | 9/1993 | Baas |
| 5,416,753 A * | 5/1995 | Kanazawa et al. ............. 369/13 |
| 5,548,567 A * | 8/1996 | Sawai ...................... 369/30.39 |
| 5,802,021 A * | 9/1998 | Mukaida .................. 369/30.32 |
| 5,864,522 A * | 1/1999 | Sugano et al. ........... 369/30.29 |
| 5,959,951 A * | 9/1999 | Inatani et al. .............. 369/30.8 |
| 6,005,744 A * | 12/1999 | Terashima .................... 360/92 |

FOREIGN PATENT DOCUMENTS

EP 0 697 695 2/1996

* cited by examiner

Primary Examiner—Ali Neyzari
(74) Attorney, Agent, or Firm—Oblon, Spivak, McClelland, Maier & Neustadt, P.C.

(57) ABSTRACT

A disk-type recording medium is carried by a disk carrying section and accommodated into one of layered accommodation shelves of a disk accommodation section. A memory stores position information of the disk carrying section with respect to the accommodation shelves. A controller controls the disk carrying section in accordance with the stored position information to move to a position corresponding to each accommodation shelf. A stopping state detection section includes a light emitting element and a light receiving element provided on the disk carrying section adjacent the disk accommodation section and detects a stopping state of the disk carrying section with respect to each accommodation shelf based on a received light amount of the light receiving element depending upon a state of a light intercepting disk which is transferred between the disk carrying section and the accommodation shelf. An updating section determines an optimum stop position of the disk carrying section with respect to each accommodation shelf in response to the detected stopping state and updates the position information stored in the memory with the position information corresponding to the optimum stop position.

14 Claims, 22 Drawing Sheets

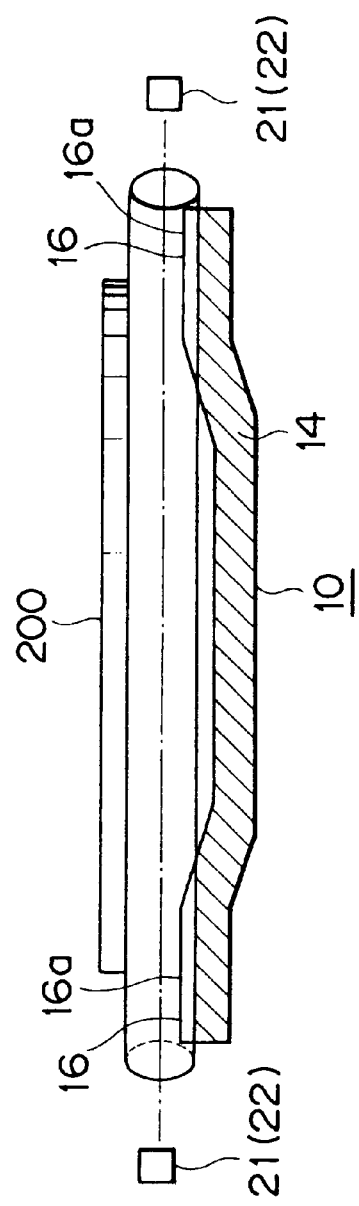
F I G. 20
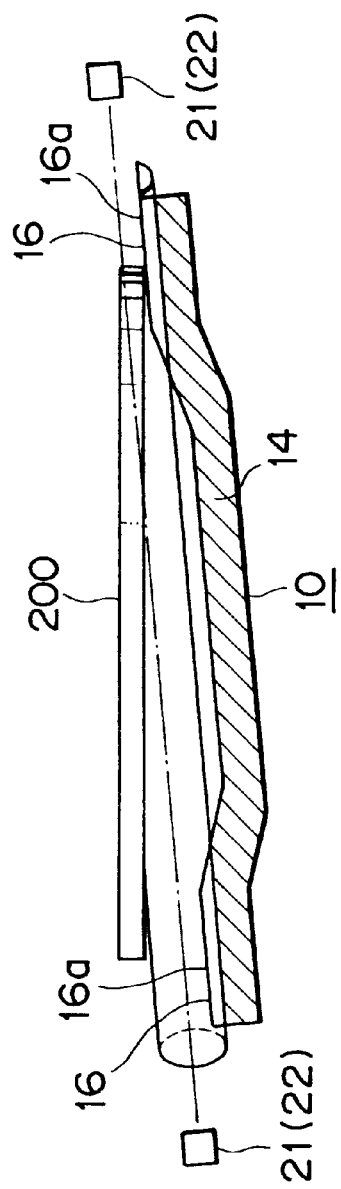
F I G. 21

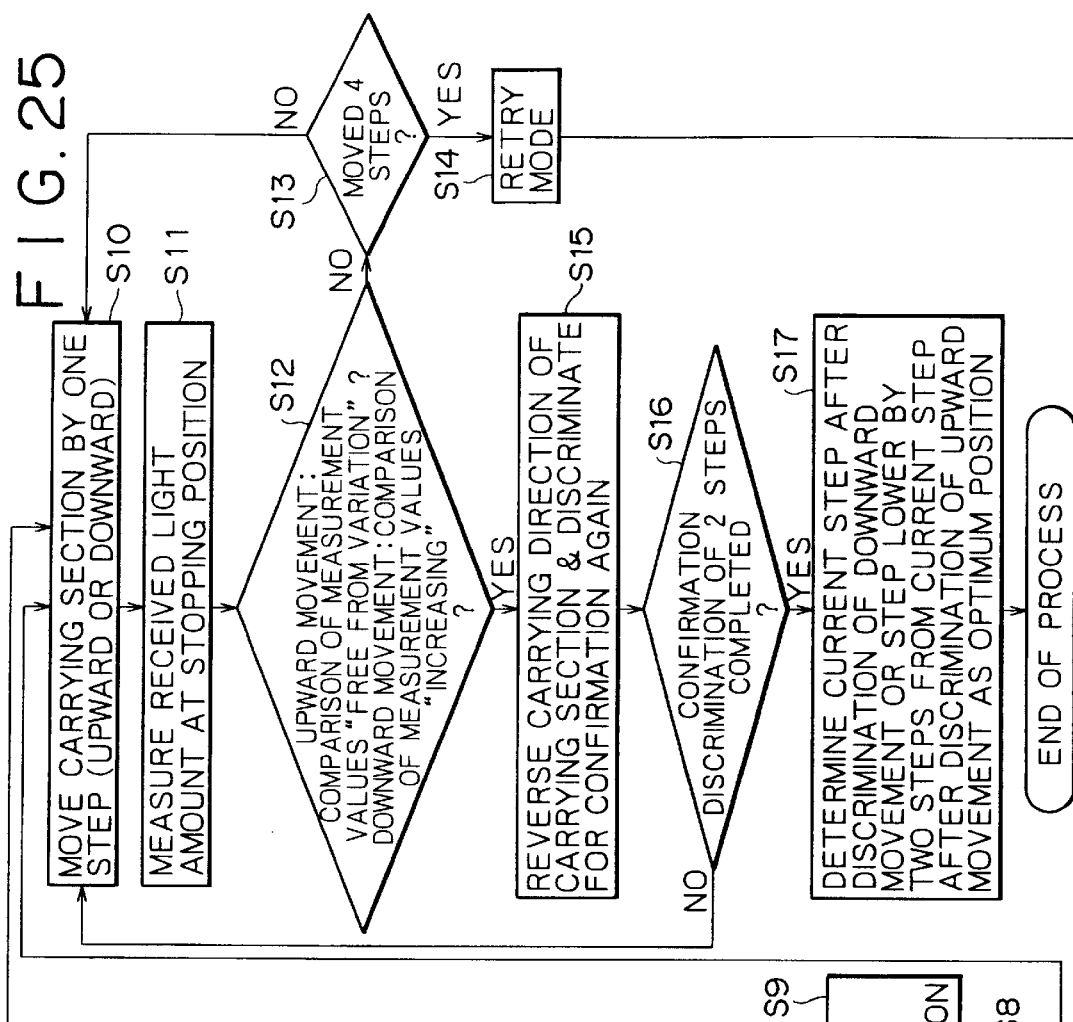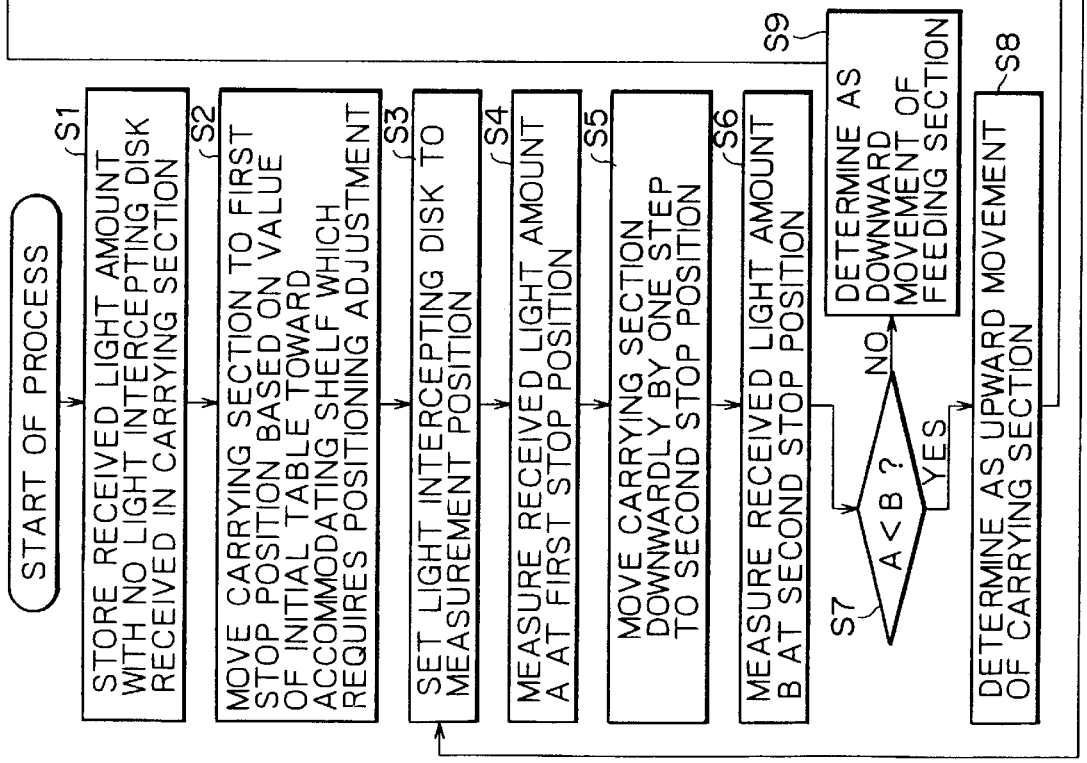

DISK CARRYING APPARATUS AND DISK CARRYING METHOD INVOLVING DETERMINING OPTIMUM STOP POSITION OF DISK CARRIER BASED ON DETECTED STOPPING STATE OF DISK CARRIER

BACKGROUND OF THE INVENTION

This invention relates to a disk carrying apparatus and a disk carrying method, and more particularly to a disk carrying apparatus and a disk carrying method for a disk carrying apparatus which includes a disk carrying section for carrying a disk-type recording medium and a disk accommodation section for accommodating the disk-type recording medium.

Disk carrying apparatus wherein a disk-type recording medium is carried by a disk carrying section are conventionally available. As one of disk carrying apparatus of the type mentioned, an apparatus called disk changer is available. The disk changer includes a disk accommodation section having a plurality of accommodation shelves for accommodating a plurality of disk-type recording media separately from each other. A disk-type recording medium is transferred between the disk carrying section and any of the disk accommodation shelves to exchange the disk-type recording medium.

In such a disk changer as described above, in order to accommodate a disk-type recording medium in an appropriate condition from the disk carrying section into each of the accommodation shelves of the disk accommodation section, it is necessary for the disk carrying section to be set to an optimum stop position with respect to each of the accommodation shelves of the disk accommodation section. Thus, positioning adjustment for setting the disk carrying section to the optimum stop position is performed.

The following methods for positioning adjustment of a conventional disk changer are available.

(1) A light intercepting plate is provided separately for each of a plurality of accommodation shelves while a pair of photo-couplers for position detection are provided on the disk carrying section. The disk changer detects an edge of each of the light intercepting plates by the photo-couplers and stops the disk carrying section within an allowable range for a stop position set in advance based on a result of the detection.

(2) The disk changer sets an origin position for the disk carrying section in advance and measures the distances between arbitrary several accommodation shelves and the origin using a CCD (Charge Coupled Device) camera. Then, the disk changer calculates displacement amounts in distance from designed distances between the accommodation shelves and the origin based on results of the measurement and corrects the designed distances with the displacement amounts.

However, in the method (1) in the conventional disk changer described above, a pulse counter, an oscilloscope and so forth for determining the allowable range for a stop position are required and a light intercepting plate is required for each of the accommodation shelves. Therefore, the method (1) has a problem in that a number of parts are required and it costs a lot.

In the method (2) described above, a high degree of reliability in positioning adjustment can be assured with the arbitrary several accommodation shelves with regard to which actual measurement is performed. However, also such accommodation shelves which do not allow sufficient correction possibly remain, and therefore, a high degree of reliability in positioning adjustment as a whole may not sometimes be assured. Further, the method (2) requires a CCD camera for measurement and has a problem also in that it costs a lot similarly to the method (1).

SUMMARY OF THE INVENTION

It is an object of the present invention to provide a disk carrying apparatus and a disk carrying method by which positioning adjustment for setting a disk carrying section to an optimum stop position with respect to a disk accommodating section can be performed at a low cost.

In order to attain the object described above, according to an aspect of the present invention, there is provided a disk carrying apparatus, comprising a disk carrying section for carrying a disk-type recording medium, a disk accommodation section including a plurality of layered accommodation shelves for accommodating the disk-type recording medium carried by the disk carrying section into one of the accommodation shelves, a storage section for storing position information of the disk carrying section with respect to the accommodation shelves of the disk accommodation section, control means for controlling the disk carrying section in accordance with the position information stored in the storage section to move to a position corresponding to each of the accommodation shelves, stopping state detection means including a light emitting element and a light receiving element provided on the disk carrying section adjacent the disk accommodation section for detecting a stopping state of the disk carrying section with respect to each of the accommodation shelves based on a received light amount of the light receiving element depending upon a state of a light intercepting disk which is transferred between the disk carrying section and the accommodation shelf, and updating means for determining an optimum stop position of the disk carrying section with respect to each of the accommodation shelves in response to the stopping state detected by the stopping state detection means and updating the position information stored in the storage section with the position information corresponding to the optimum stop position.

The disk carrying apparatus is advantageous in that positioning adjustment for setting the optimum position of the disk carrying section with respect to the accommodation shelf of the disk carrying section can be performed at a low cost with a small number of parts without the necessity to use expensive detection means like a measuring instrument such as, for example, a CCD camera or an oscilloscope.

The stopping state detection means may detect the stopping state of the disk carrying section in a state wherein the center of gravity of the light intercepting disk is positioned in the accommodation shelf after the light intercepting disk is moved from the disk carrying section to the disk accommodation section. The disk carrying apparatus is advantageous in that detection of the stop position is performed with certainty, and further augmentation of the reliability in detection of the optimum stop position can be anticipated.

The disk carrying apparatus may further comprise a disk supporting section for supporting the light intercepting disk moved from the disk carrying section to the disk accommodation section, and the disk supporting section may have a passing hole formed therein for light from the light emitting element to the light receiving element and the stopping state detection means may detect the stopping state of the disk carrying section from rays of light emitted from the light emitting element and received by the light receiving element through a space defined by the light intercepting disk and the passing hole. The disk carrying apparatus is advantageous in that detection of the optimum stop position can be performed very readily.

Preferably, the control means controls the disk carrying section to move to a plurality of stop positions with respect to a predetermined one of the accommodation shelves and the stopping state detection means detects the stopping state for each of the plurality of stop positions, and the updating means determines an optimum stop position of the disk carrying section with respect to the accommodation shelf in response to the detected stop positions and updates the position information for the accommodation shelf stored in the storage section with the position information corresponding to the optimum stop position. The disk carrying apparatus is advantageous in that detection of the optimum stop position can be performed accurately when compared with an alternative case wherein, for example, an actual displacement amount is detected by calculation with reference to a designed value to set an optimum stop position.

Further preferably, the control means controls the disk carrying section to move to a second stop position in a particular direction after the stopping state when the disk carrying section is at a first stop position corresponding to the position information for the predetermined accommodation shelf stored in the storage section is detected, and the stopping state detection means acquires a first detection result of a voltage based on the received light amount of the light receiving element corresponding to the first stop position and a second detection result of a voltage based on the received light amount of the light receiving element corresponding to the second stop position, and then the control means determines a direction of movement of the disk carrying section to a third stop position in response to a variation from the first detection result to the second detection result and controls the movement of the disk carrying section. The disk carrying apparatus is advantageous in that the procedure of positioning adjustment is simple and malfunction is prevented. The disk carrying apparatus is advantages also in that, since also control is easy, also reduction of the adjustment time can be anticipated.

According to another aspect of the present invention, there is provided a disk carrying method, comprising the steps of moving a disk carrying section to a stop position opposing to one of a plurality of accommodation shelves layered in a disk accommodation section, moving a light intercepting disk carried by the disk carrying section to the accommodation shelf, measuring, using a light emitting element and a light receiving element provided on the disk carrying section in an opposing relationship to each other across the light intercepting disk, a received light amount of the light receiving element at the stop position, and determining an optimum stop position of the disk carrying section with respect to the accommodation shelf in accordance with the received light amount.

The disk carrying method is advantageous in that positioning adjustment for setting the optimum position of the disk carrying section with respect to the accommodation shelf of the disk carrying section can be performed at a low cost with a small number of parts without the necessity to use expensive detection means like a measuring instrument such as, for example, a CCD camera or an oscilloscope.

The above and other objects, features and advantages of the present invention will become apparent from the following description and the Appended claims, taken in conjunction with the accompanying drawings in which like parts or elements denoted by like reference symbols.

BRIEF DESCRIPTION OF THE DRAWINGS

FIG. 20 is a schematic sectional view showing a relationship between the inclination of the disk carrying section and the received light amount when the disk carrying section is not inclined;

FIG. 21 is a similar view but showing a relationship between the inclination of the disk carrying section and the received light amount when the disk carrying section is inclined and the distance between the light intercepting disk and a disk receiving face is small;

FIG. 25 is a flowchart illustrating a procedure of positioning adjustment of the disk changer.

DETAILED DESCRIPTION OF THE PREFERRED EMBODIMENT

In the following, a disk carrying apparatus to which the present invention is applied is described with reference to the accompanying drawings. It is to be noted that, in the embodiment described below, the present invention is applied to a disk changer wherein a disk-type recording medium is transferred between a disk carrying section and a disk accommodation section having a plurality of accommodation shelves to, exchange the disk-type recording medium.

Figure 1:
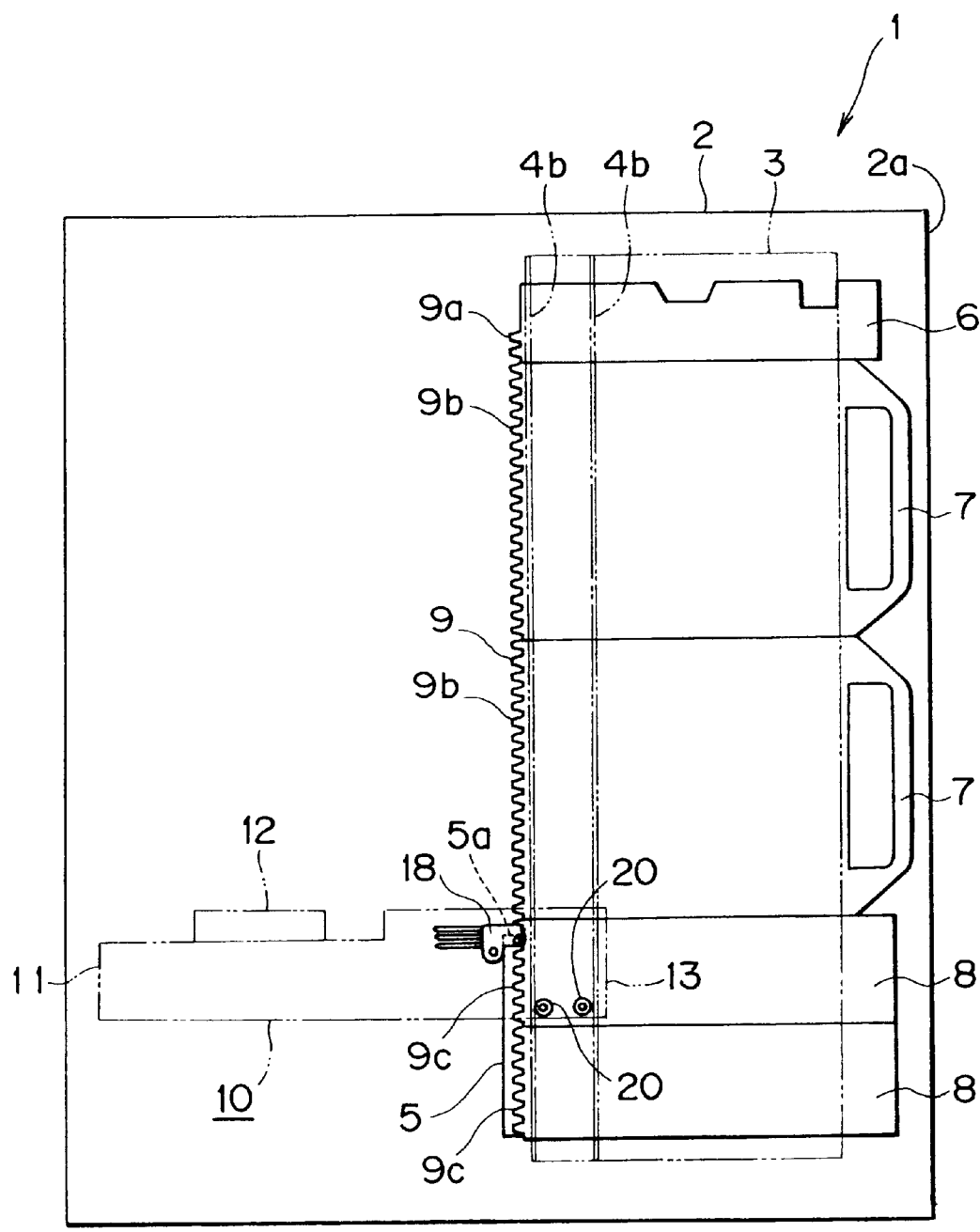
FIG. 1 is a schematic side elevational view of a disk changer to which a disk carrying apparatus of the present invention is applied.
Figure 2:
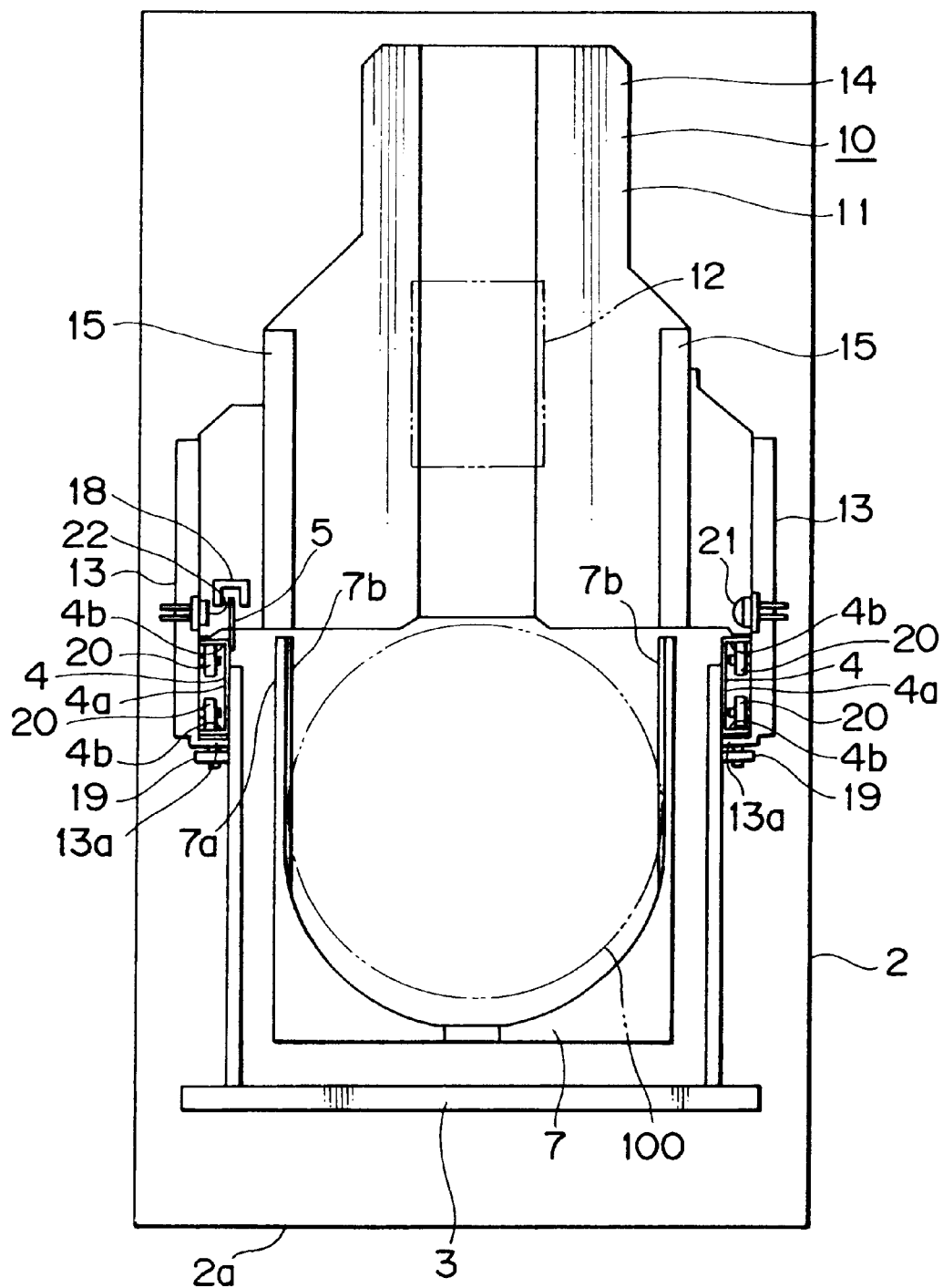
FIG. 2 is a schematic top plan view showing a disk carrying section and a disk accommodation section of the disk changer.

The disk changer 1 includes an outer housing 2 in which required members and mechanisms are provided (refer to FIGS. 1 and 2).

The outer housing 2 has a vertically elongated boxlike profile having an opening on one side thereof, and the side of the disk changer 1 where the opening 2a of the outer housing 2 is positioned is referred to as the front.

A body side housing 3 is disposed adjacent the opening 2a in the outer housing 2. The body side housing 3 is open on both of the front and the rear thereof.

A pair of guide rails 4 are provided at rear end portions of the opposite side walls of the body side housing 3. Each of the guide rails 4 is a unitary member formed from a mounted portion 4a mounted on the body side housing 3 and a pair of guide portions 4b projecting outwardly from the opposite front and rear end portions of the mounted portion 4a. Each of the guide rails 4 extends from the top end to the bottom end of the body side housing 3.

A light intercepting plate 5 is mounted at a rear end portion of one of the guide rails 4, and projects rearwardly and extends upwardly and downwardly. The light intercepting plate 5 is provided to allow detection of a reference position of a disk carrying section which is hereinafter described with respect to the body side housing 3, that is, an origin position. The top end 5a of the light intercepting plate 5 provides the origin position.

The internal space of the body side housing 3 serves as a mounting space in which several mounting blocks including an insertion/removal section 6, a pair of disk accommodation sections 7 and a pair of drive sections 8 are mounted. The mounting blocks 6, 7 and 8 can be mounted into the body side housing 3 by a manufacturer inserting them from the front of the body side housing 3 through the opening 2a of the outer housing 2. The mounting blocks 6, 7 and 8 mounted can be removed from the body side housing 3 by drawing out them from the front of the body side housing 3.

The insertion/removal section 6 is a mounting block for inserting a plurality of disk-type recording media 100 into the disk changer 1 and removing the disk-type recording media 100 from the disk changer 1. The insertion/removal section 6 is mounted art an upper end portion of the body side housing 3. A pair of rack portions 9a (only one is shown in FIG. 1) are provided in a spaced relationship from each other in leftward and rightward directions at lower end portions of a rear end portion of the insertion/removal section 6.

The disk accommodation sections 7 are mounting blocks for accommodating the disk-type recording media 100 inserted in the disk changer 1. Each of the disk accommodation sections 7 has a plurality of accommodation shelves 7a provided in a layered fashion therein for accommodating the disk-type recording media 100. Each of the accommodation shelves 7a has a pair of receiving portions 7b positioned in a spaced relationship from each other in leftward and rightward directions and projecting toward each other, that is, projecting inwardly (refer to FIGS. 2 and 3). Inner side portions of the receiving portions 7b are formed with inclined faces such that the thicknesswise dimensions thereof decrease toward each other so that a disk-type recording medium 100 can be introduced readily into the receiving portions 7b of the accommodation shelf 7a.

The two disk accommodation sections 7 are mounted on the body side housing 3 in an upwardly and downwardly adjacent relationship to each other below the insertion/removal section 6. A pair of rack portions 9b (only one is shown in FIG. 1) are provided in a leftwardly and rightwardly spaced relationship from each other at rear end portions of the disk accommodation sections 7. The rack portions 9b are formed in shape and size similar to those of the rack portions 9a of the insertion/removal section 6.

The drive sections 8 are mounting blocks for recording or reproducing information signals onto or from the disk-type recording media 100 inserted in the disk changer 1. The two drive sections 8 are mounted on the body side housing 3 in an upwardly and downwardly adjacent relationship to each other below the disk accommodation sections 7. A pair of rack portions 9c (only one is shown in FIG. 1) are provided in a leftwardly and rightwardly spaced relationship from each other at rear end portions of the drive sections 8. The rack portions 9c are formed in shape and size similar to those of the rack portions 9a and 9b.

When the mounting blocks of the insertion/removal section 6, disk accommodation sections 7 and drive sections 8 are mounted on the body side housing 3, a pair of continuous racks 9 spaced in leftward and rightward directions from each other are formed by the rack portions 9a, 9b and 9c (refer to FIG. 1).

A disk carrying section 10 is supported for movement in upward and downward directions on the body side housing 3. The disk carrying section 10 has a base portion 11, a picking portion 12 and a pair of supported portions 13 (refer to FIGS. 1 to 3).

The base portion 11 has a body portion 14 and a pair of control walls 15 attached to the body portion 14 (refer to FIGS. 3 to 6).

A pair of receiving portions 16 are formed higher by one step than the other portion on the opposite left and: right side edges of the body portion 14. The receiving portions 16 are composed of disk receiving faces 16a directed upwardly and serving as disk supporting portions and inclined faces 16b contiguous to the inner sides of the disk receiving faces 16a. First passing grooves 16c are formed at positions of the receiving portions 16 rather near to the front ends such that they extend in directions (hereinafter referred to as leftward and rightward directions) perpendicular to the longitudinal direction of the receiving portions 16 and are open upwardly.

The control walls 15 are attached to substantially front half portions of the opposite left and right side edges of the body portion 14 and formed long in the forward and backward directions. The control walls 15 are formed from rising portions 15*a* extending vertically upwardly from the body portion 14 and projecting portions 15*b* projecting toward each other from portions of the rising portions 15*a* except lower end portions. Second passing grooves 15*c* are formed at positions of the control walls 15 corresponding to the first passing grooves 16*c* of the receiving portions 16 such that they extend in leftward and rightward directions and are open downwardly.

A pair of passing holes 17 are formed from the first passing grooves 16*c* formed on the receiving portions 16 and the second passing grooves 15*c* formed on the control walls 15. The passing holes 17 have an opening, for example, of a horizontally elongated rectangular shape.

A pair of pinions not shown are supported in a spaced relationship from each other in the leftward and rightward directions for rotation at lower end portions of a front wall of the base portion 11, and the racks 9 are held in meshing engagement with the pinions. The pinions are rotated by a drive mechanism not shown which includes a drive motor (stepping motor) provided on the base portion 11. Consequently, when the pinions are rotated by the drive mechanism, the disk carrying section 10 is moved upwardly or downwardly.

A photo-interrupter 18 is provided at a left end portion of the base portion 11 (refer to FIGS. 1 and 2). The top end 5*a* of the light intercepting plate 5 is detected by the photo-interrupter 18 thereby to detect the origin position. FIG. 1 illustrates a state wherein the origin position is detected by the photo-interrupter 18 and the disk carrying section 10 is stopped at the position.

The picking portion 12 is supported for movement in forward and backward directions on the base portion 11 and functions to move a disk-type recording medium 100 between the insertion/removal section 6, disk accommodation sections 7 or drive sections 8 and the disk carrying section 10.

The supported portions 13 are provided at front end portions of the opposite left and right side faces of the base portion 11 and partly project forwardly from the base portion 11 (refer to FIG. 2). Front-end portions of the supported portions 13 are formed as bent portions 13*a* bent inwardly, and moving rollers 19 are supported for rotation on front walls of the bent portions 13*a*. A pair of guide rollers 20 are supported for rotation in a forwardly and rearwardly spaced relationship from each other on an inner face of that portion of each of the left land right supported portions 13 which projects forwardly and is positioned rearwardly of the bent portion 13*a*.

The disk carrying section 10 is supported on the body side housing 3 such that the pinions are held in meshing engagement with the racks 9 as described above and the moving rollers 19 contact from outwardly with side faces of the body side housing 3 while the guide rollers 20 contact with faces of the guide portions 4*b* of the guide rails 4 provided on the body side housing 3 which oppose each other (refer to FIG. 2). As the pinions are rotated as described above, the disk carrying section 10 is moved upwardly is downwardly with respect to the body side housing 3 while the moving rollers 19 and the guide rollers 20 roll.

A light emitting element 21 and a light receiving element 22 which are components of position detection means of the disk carrying section 10 are provided in an opposing relationship to each other on the supported portions 13. Detection light emitted from the light emitting element 21 passes through one of the passing holes 17, across the base portion 11 and through the other passing hole 17 and is inputted to the light receiving element 22 (refer to FIGS. 4 to 6).

Accommodation of a disk-type recording medium 100 from the disk carrying section 10 into an accommodation shelf 7*a* is performed by forward movement of the picking portion 12 of the disk carrying section 10 on which the disk-type recording media 100 is held. Removal of a disk-type recording medium 100 from an accommodation shelf 7*a* to the disk carrying section 10 is performed as the picking portion 12 of the disk carrying section 10 moves forwardly and grasps the disk-type recording medium 100 and then the picking portion 12 moves rearwardly. When a disk-type recording medium 100 is transferred between the disk carrying section 10 and an accommodation shelf 7*a*, the disk-type recording medium 100 is slidably moved at part of an outer circumferential edge thereof on the disk receiving faces 16*a* of the receiving portions 16.

Figure 7:
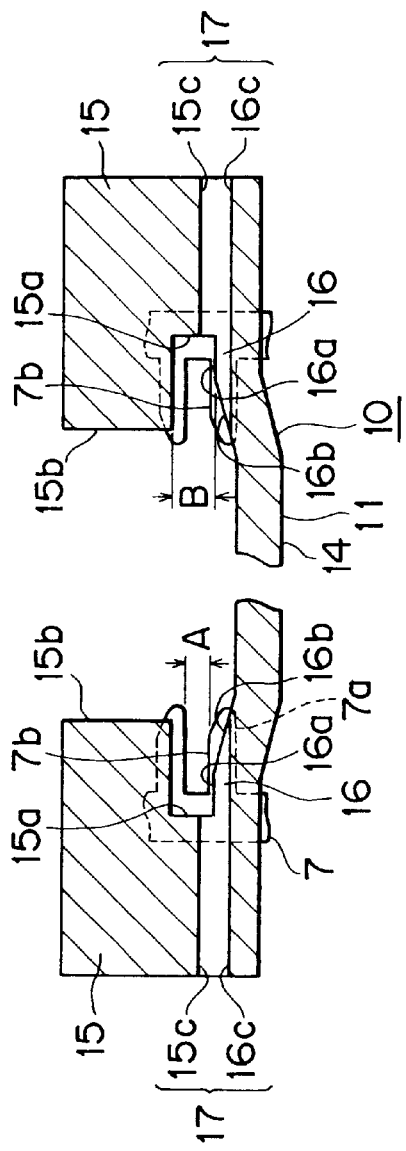
FIGS. 7 and 8 are schematic sectional views showing a relationship between the disk carrying section and a storage shelf when the disk carrying section is at an optimum stop position and when the disk carrying section is not at the optimum stop position, respectively.
Figure 8:
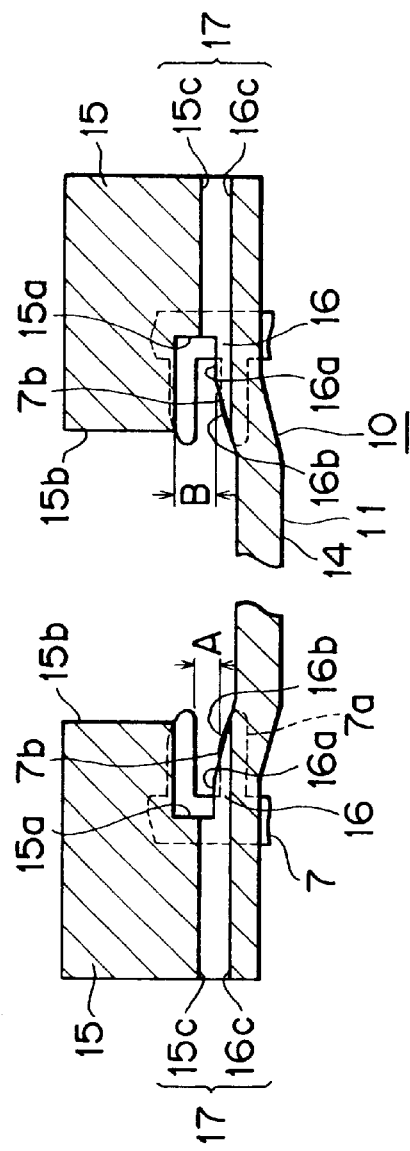

Since the drive motor for moving the disk carrying section 10 upwardly and downwardly is a stepping motor, when a disk-type recording medium 100 is transferred between the disk carrying section 10 and an accommodation shelf 7*a*, the disk carrying section 10 cannot necessarily be stopped so as to position the disk receiving faces 16*a* of the disk carrying section 10 at an equal height with respect to the bottom of the accommodation shelf 7*a*. Further, as shown in FIGS. 7 and 8, the height of each accommodation shelf 7*a*, that is, a groove height A, is set smaller than a distance B between the disk receiving faces 16*a* and the projecting portions 15*b* of the control walls 15 which is a space in the vertical direction in which a disk-type recording medium 100 is to be positioned.

Accordingly, in the disk changer 1 which uses a stepping motor, it is necessary to assure the groove height A of the accommodation shelf 7*a* to the utmost. Further, in order to allow a disk-type recording medium 100 to be moved smoothly between the disk carrying section 10 and the accommodation shelf 7*a*, it is necessary to stop the disk carrying section 10 with respect to the accommodation shelf 7*a* such that the disk receiving faces 16*a* may be positioned a little lower than the bottom of the accommodation shelf 7*a* as seen in FIG. 7. In particular, if the position of the disk carrying section 10 of FIG. 7 is determined as an optimum stop position of the disk carrying section 10 with respect to the accommodation shelf 7*a*. If the disk carrying section 10 is moved upwardly, for example, by more than one step from the optimum stop position, then the disk receiving faces 16*a* are positioned higher than the bottom of the accommodation shelf 7*a*. Consequently, the groove height A of the accommodation shelf 7*a* cannot be assured to the most (refer to FIG. 8), and there is the possibility that accommodation and removal of a disk-type recording medium 100 may be obstructed.

It is to be noted that the fact that a little difference in height is present between the disk receiving faces 16*a* and the bottom face of the accommodation shelf 7*a* when the disk receiving faces 16*a* are positioned a little lower than the bottom face of the accommodation shelf 7*a* at the optimum stop position does not make an obstacle to transfer of a disk-type recording medium 100 between the disk carrying section 10 and an accommodation shelf 7*a* because the inner side portions of the receiving portions 7*b* of the accommodation shelf 7*a* are formed with inclined faces such that they have a thickness decreasing toward each other so as to facilitate introduction of a disk-type recording medium 100. One step of the stepping motor is set, for example, to an amount of one twelfth of an accommodation shelf 7*a*.

The disk changer 1 has data of the designed optimum stop positions of the disk carrying section 10 with respect of the accommodation shelves 7a stored therein as an initial table. Actually, the optimum stop positions are different depending upon the errors in parts, errors in assembly and so forth of the components of the disk changer 1. Accordingly, in order to stop the disk carrying section 10 at an optimum stop position, positioning adjustment of the optimum stop position of the disk carrying section 10 with respect to each of the accommodation shelves 7a must be performed.

In the disk changer 1, positioning adjustment of the disk carrying section 10 with respect to the accommodation shelves 7a is performed by measuring the light amount of detection light emitted from the light emitting element 21 and received by the light receiving element 22 through the passing holes 17. In order to perform such measurement, a light intercepting disk 200 for intercepting the detection light is used.

The light intercepting disk 200 is formed in a size and a shape similar to those of the disk-type recording medium 100 used with the disk changer 1. The positioning adjustment is performed in a state wherein the center P which is the center of gravity of the light intercepting disk 200 is positioned in an opposing relationship to a rear end portion of an accommodation shelf 7a as a result of movement of the light intercepting disk 200 toward the accommodation shelf 7a by the picking portion 12 of the disk carrying section 10, that is, in a state wherein the light intercepting disk 200 relies upon the accommodation shelf 7a (refer to FIG. 3). This position of the light intercepting disk 200 is determined as a measurement position. Then, in the state wherein the light intercepting disk 200 is at the measurement position, part of the detection light emitted from the light emitting element 21 and passing the passing holes 17 can be intercepted by the light intercepting disk 200.

If the disk carrying section 10 is successively moved upwardly or downwardly by one step distance in the state wherein the light intercepting disk 200 relies upon the accommodation shelf 7a in such a manner as described above, then a gap is formed between the light intercepting disk 200 and the disk receiving faces 16a in response to the stop position of the disk carrying section 10 and the amount of the gap is varied. Then, if the detection light is irradiated from the light emitting element 21 toward the light receiving element 22, then the amount of the detection light intercepted by the light intercepting disk 200 is varied by the variation of the amount of the gap between the light intercepting disk 200 and the disk receiving faces 16a. Thus, the light amount received by the light receiving element 22 is varied by the variation of the amount of the intercepted detection light.

Accordingly, if the received light amount of the light receiving element 22 in accordance with the stop position of the disk carrying section 10 is measured in the state wherein the light intercepting disk 200 relies upon the accommodation shelf 7a, the stop position of the disk carrying section 10 with respect to the accommodation shelf 7a can be detected.

FIGS. 9 to 17 schematically illustrate the variation of the received light amount received by the light receiving element 22 when the disk carrying section 10 is moved upwardly or downwardly in the state wherein the light intercepting disk 200 relies upon an accommodation shelf 7a. It is to be noted that, when the disk carrying section 10 is moved upwardly or downwardly in the state wherein the light intercepting disk 200 relies upon an accommodation shelf 7a, the picking portion 12 is retracted to a position at which it does not interfere with the light intercepting disk 200 and the holding of the light intercepting disk 200 by the picking portion 12 is cancelled. In FIGS. 9 to 17, a portion indicated with a net pattern corresponds to the light amount of the detection light received by the light receiving element 22 through the passing holes 17.

Figure 18:
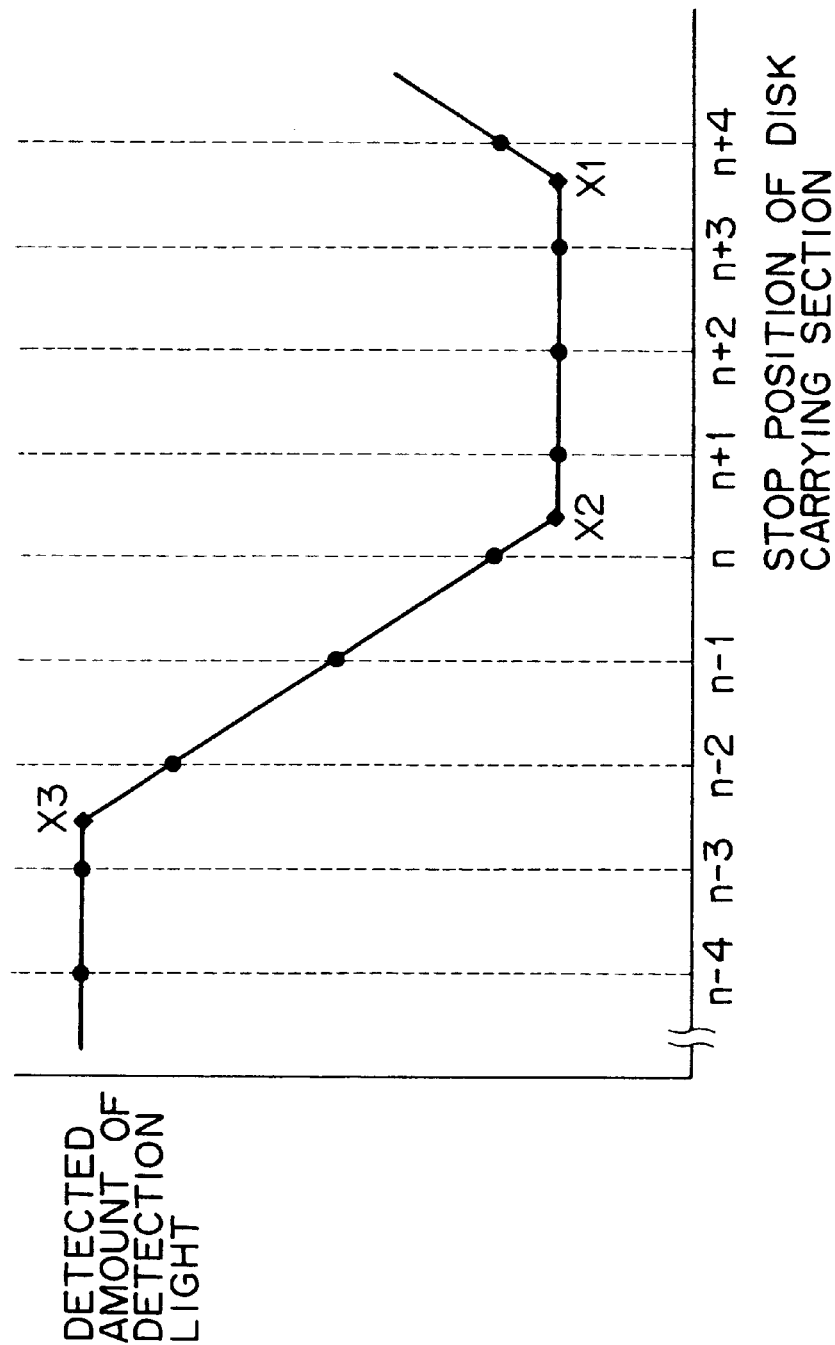
FIG. 18 is a graph illustrating a relationship between a detection amount of detection light detected by a light receiving element and a stop position (step number) of the disk carrying section.

FIG. 18 is a graph illustrating a relationship between the stop position of the disk carrying section 10 and the detected amount of the detection light where the stop position of the disk carrying section 10 is represented by the number of steps.

Figure 9:
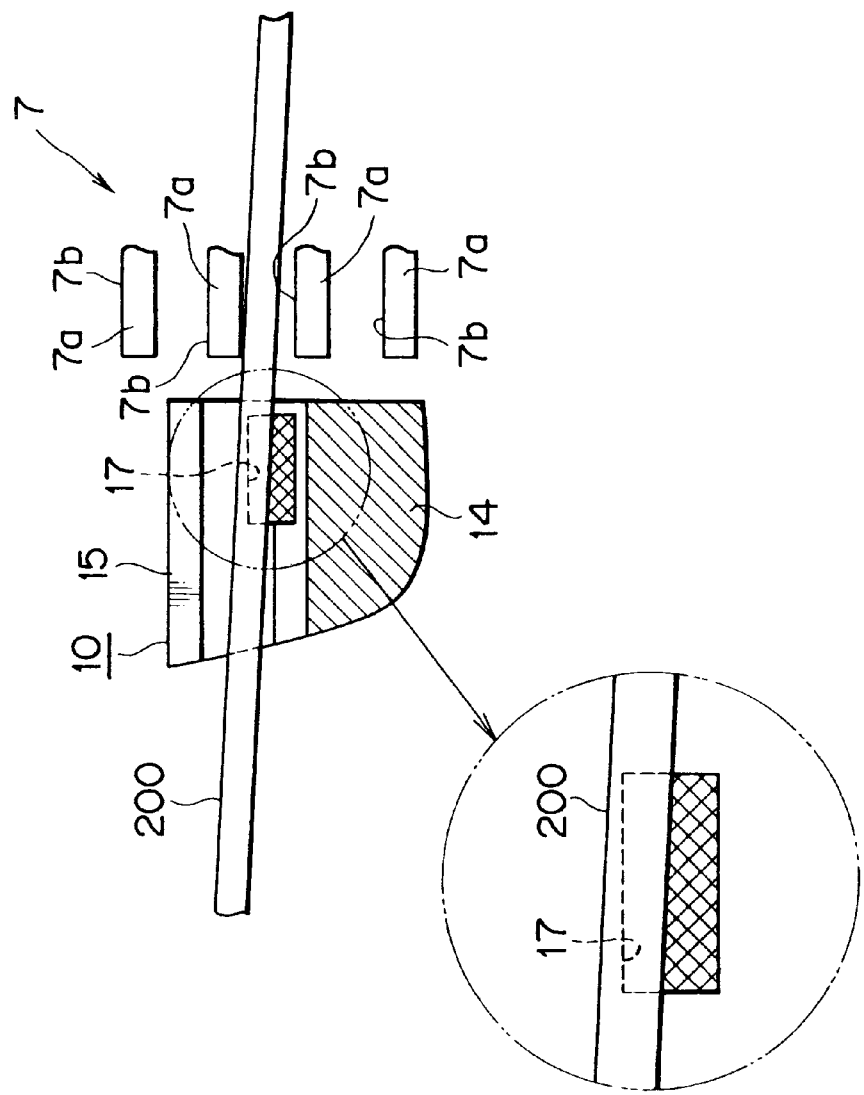
FIG. 9 is a schematic sectional view showing a relationship between a stop position of the disk carrying section and the area of an opening of the passing hole when the disk carrying section is positioned at a step number n+4.

FIG. 9 illustrates a state wherein the top face of the light intercepting disk 200 contacts with the lower faces of the receiving portions 7b on the upper side of an accommodation shelf 7a in which the light intercepting disk 200 is accommodated while the disk carrying section 10 is at a stop position higher by 4 steps than an optimum stop position. In other words, FIG. 9 shows the light intercepting disk 200 which is in a forwardly downwardly inclined state. The state of FIG. 9 corresponds to the step number n+4 of FIG. 18. At this time, since the light intercepting disk 200 is in a forwardly downwardly inclined state, the light intercepting disk 200 does not exhibit a plane contact with the disk receiving faces 16a of the receiving portions 16 but exhibits a line contact with the front ends of the disk receiving faces 16a, and a gap is produced between the light intercepting disk 200 and the disk receiving faces 16a. Accordingly, when compared with an alternative case wherein the light intercepting disk 200 is in a plane contact with the disk receiving faces 16a, the light amount measured is greater.

Figure 10:
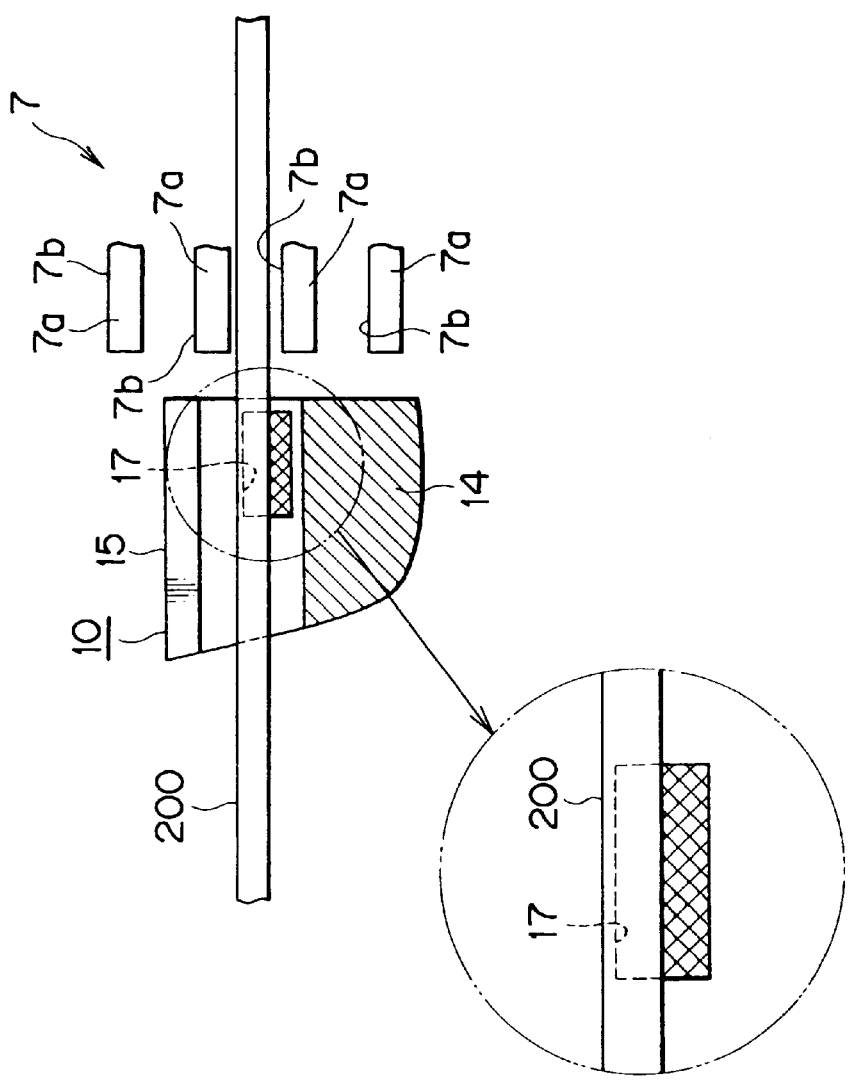
FIG. 10 is a similar view but showing the relationship when the disk carrying section is positioned at a step number n+3.

FIG. 10 illustrates a state wherein the disk carrying section 10 is moved downwardly by one step from the state of FIG. 9. The top face of the light intercepting disk 200 is spaced away from the lower faces of the receiving portions 7b on the upper side of the accommodation shelf 7a in which the light intercepting disk 200 is accommodated while the disk carrying section 10 is at a stop position higher by 3 steps than the optimum stop position. In particular, the light intercepting disk 200 is placed on the disk receiving faces 16a and held in a horizontal state. The state of FIG. 10 a corresponds to the step number n+3 of FIG. 18. At this time, the lower face of the light intercepting disk 200 is not placed on the receiving portions 7b of the accommodation shelf 7a, but the light intercepting disk 200 is placed on the disk receiving faces 16a. Consequently, no gap appears between the light intercepting disk 200 and the disk receiving faces 16a. Accordingly, the light amount measured is smaller than that in the case of the step number n+4 shown in FIG. 9, and the light amount corresponds to an amount having passed through the first passing grooves 16c of the receiving portions 16.

It is to be noted that, since the light intercepting disk 200 is plane contacted with and placed onto the disk receiving faces 16a during a process through which the disk carrying section 10 is moved between the step number n+4 and the step number n+3, a conversion point X1 at which the graph line changes from an inclined state to a horizontal state as seen in FIG. 18 appears between the step number n+4 and the step number n+3. This conversion point X1 indicates a point at an instant at which the light intercepting disk 200 is placed onto the disk receiving faces 16a.

Figure 11:
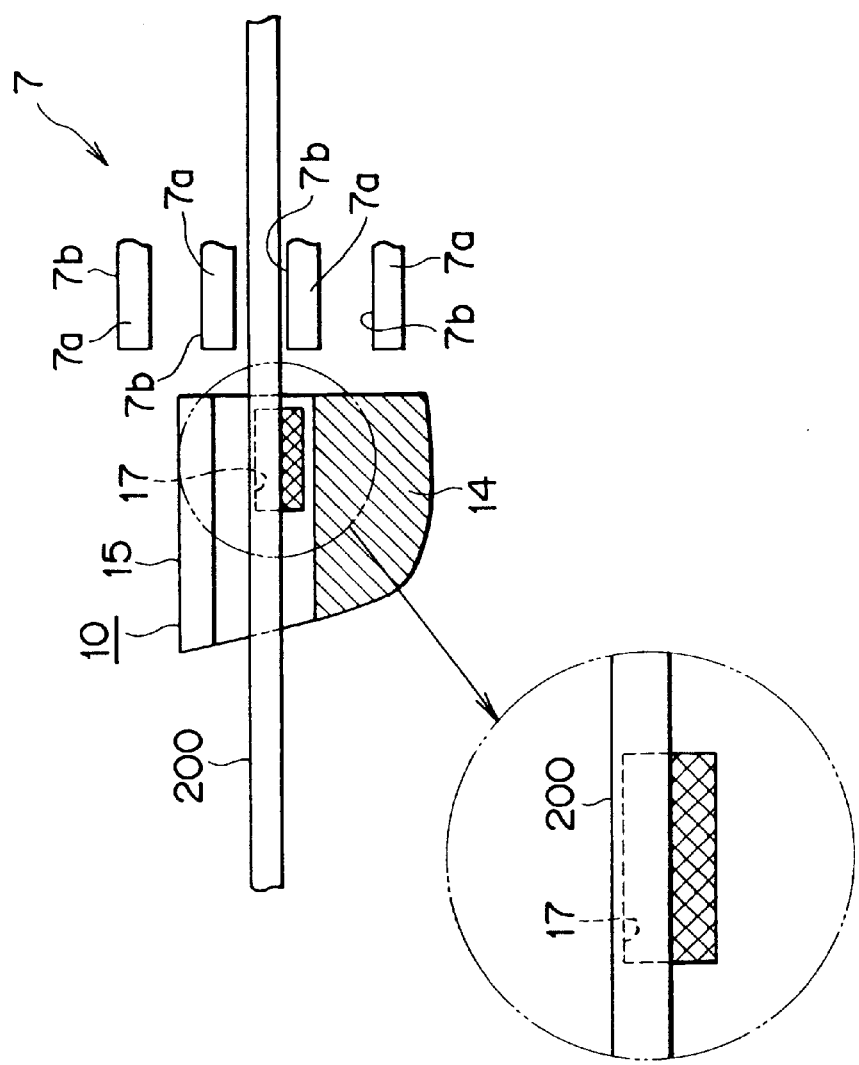
FIG. 11 is a similar view but showing the relationship when the disk carrying section is positioned at a step number n+2.

FIG. 11 illustrates a state wherein the disk carrying section 10 is moved downwardly by one step from the state of FIG. 10. The disk carrying section 10 is at a stop position higher by 2 steps than the optimum stop position and the light intercepting disk 200 is placed on the disk receiving faces 16a and held in a horizontal state. The state of FIG. 11 corresponds to the step number n+2 of FIG. 18. At this time, the lower face of the light intercepting disk 200 is not placed on the receiving portions 7b of the accommodation shelf 7a, but the light intercepting disk 200 is placed on the disk receiving faces 16a. Consequently, no gap appears between the light intercepting disk 200 and the disk receiving faces 16a. Accordingly, the light amount measured is equal to that in the case of the step number n+3 shown in FIG. 10. It is to be noted that the gap between the lower face of the light intercepting disk 200 and the receiving portions 7b is smaller than that in the state of FIG. 10.

Figure 12:
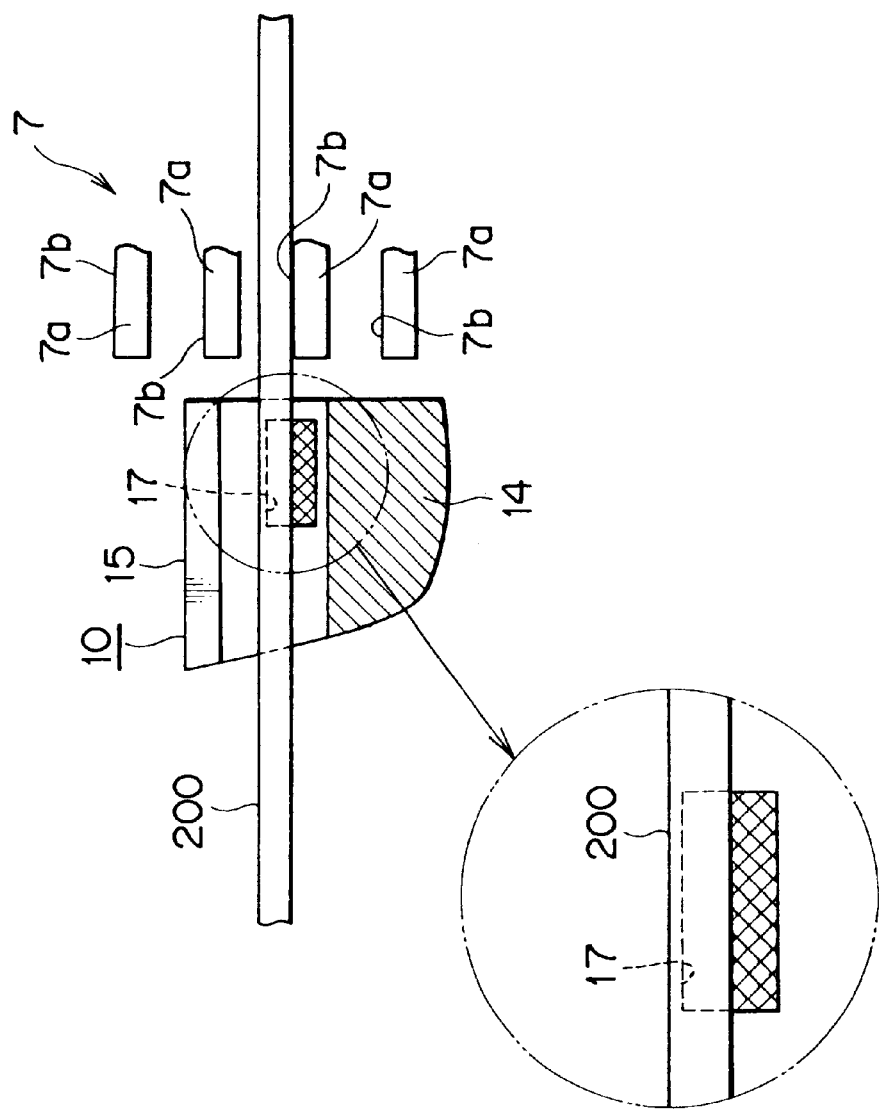
FIG. 12 is a similar view but showing the relationship when the disk carrying section is positioned at a step number n+1.

FIG. 12 illustrates a state wherein the disk carrying section 10 is moved downwardly by one step from the state of FIG. 11. The disk carrying. section 10 is at a stop position higher by 1 step than the optimum stop position and the light intercepting disk 200 is placed on the disk receiving faces 16a and held in a horizontal state. The state of FIG. 12 corresponds to the step number n+1 of FIG. 18. At this time, the lower face of the light intercepting disk 200 is not placed on the receiving portions 7b of the accommodation shelf 7a, but the light intercepting disk 200 is placed on the disk receiving faces 16a. Consequently, no gap appears between the light intercepting disk 200 and the disk receiving faces 16a. Accordingly, the light amount measured is equal to that in the case of the step number n+3 shown in FIG. 10 or the step number n+2 shown in FIG. 11. It is to be noted that the gap between the lower face of the light intercepting disk 200 and the receiving portions 7b is smaller than that in the state of FIG. 11.

Figure 13:
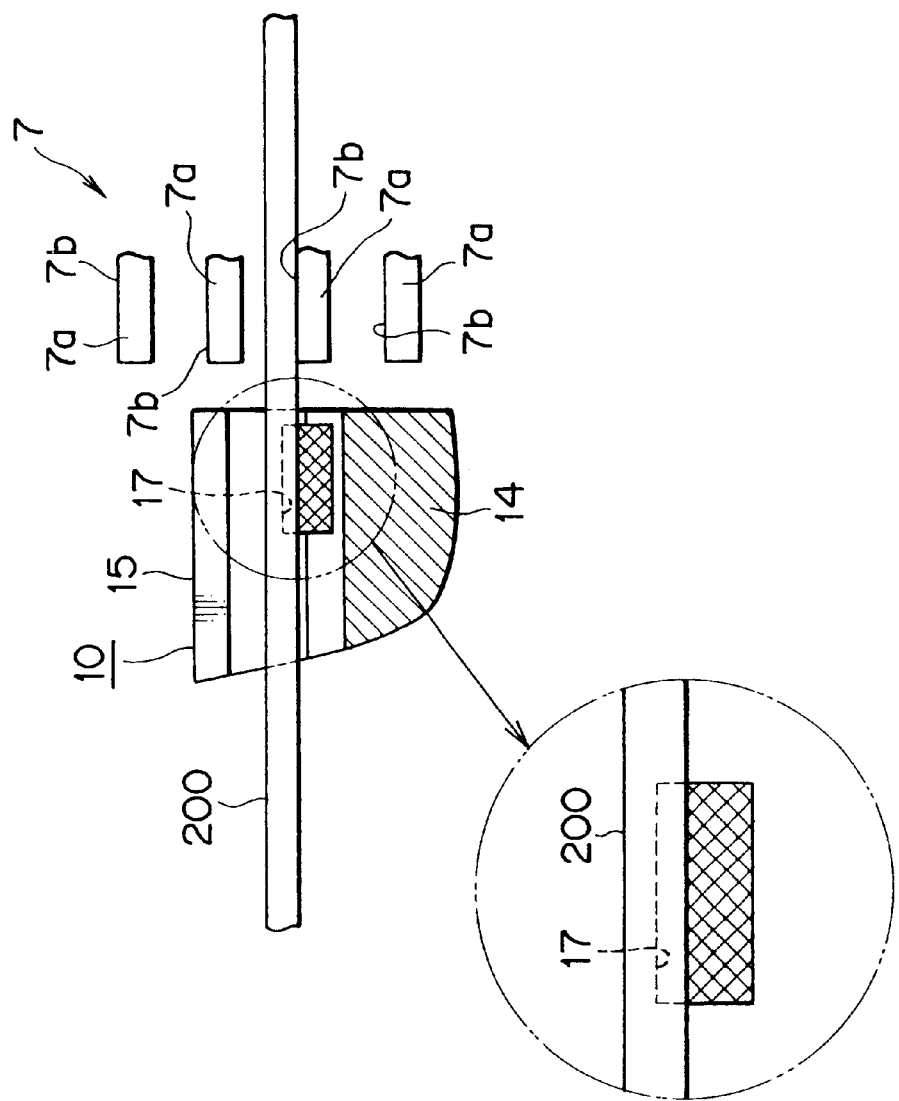
FIG. 13 is a similar view but showing the relationship when the disk carrying section is positioned at a step number n.

FIG. 13 illustrates a state wherein the disk carrying section 10 is moved downwardly by one step from the state of FIG. 12. The disk carrying section 10 is at the optimum stop position and the light intercepting disk 200 is spaced away from the disk receiving faces 16a and but placed on the receiving portions 7b and held in a horizontal state. The state of FIG. 13 corresponds to the step number n of FIG. 18. At this time, the lower face of the light intercepting disk 200 is placed on the receiving portions 7b of the accommodation shelf 7a, and therefore, no gap appears between the light intercepting disk 200 and the disk receiving faces 16a. Accordingly, the light amount measured is greater than that in the case of the step number n+1 shown in FIG. 12.

It is to be noted that, since the light intercepting disk 200 is spaced away from the disk receiving faces 16a during a process through which the disk carrying section 10 is moved between the step number n+1 and the step number n, a conversion point X2 at which the graph line changes from a horizontal state to an inclined state as seen in FIG. 18 appears between the step number n+1 and the step number n. This conversion point X2 indicates a point at an instant at which the light intercepting disk 200 is spaced away from the disk receiving faces 16a and placed onto the receiving portions 7b.

Figure 14:
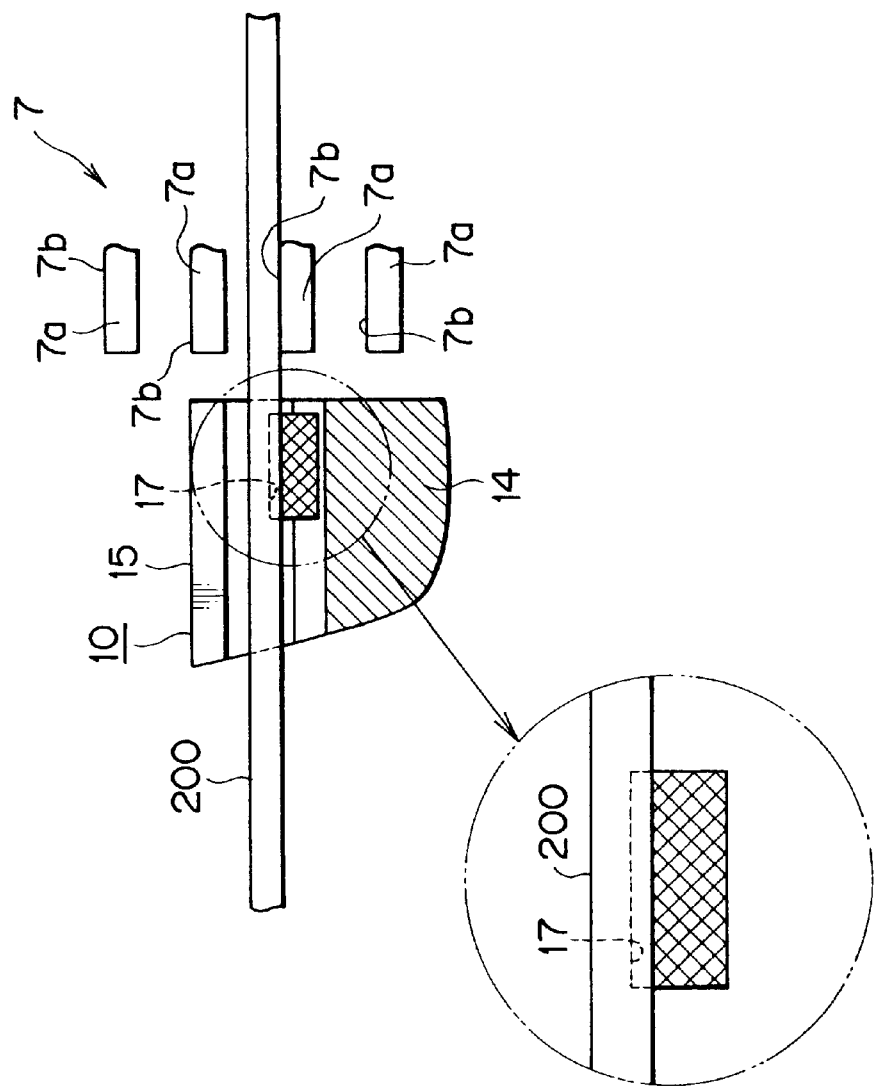
FIG. 14 is a similar view but showing the relationship when the disk carrying section is positioned at a step number n−1.

FIG. 14 illustrates a state wherein the disk carrying section 10 is moved downwardly by one step from the state of FIG. 13. The disk carrying section 10 is at a stop position lower by 1 step than the optimum stop position and the light intercepting disk 200 is placed on the receiving portions 7b and held in horizontal state. The state of FIG. 14 corresponds to the step number n−1 of FIG. 18. At this time, the lower face of the light intercepting disk 200 is placed on the receiving portions 7b of the accommodation shelf 7a, and therefore, a gap appears between the light intercepting disk 200 and the disk receiving faces 16a. This gap is greater than that in the case of the step number n because the disk carrying section 10 is moved downwardly from the state of FIG. 13. Accordingly, the light amount measured is greater than that in the case of the step number n shown in FIG. 13.

Figure 15:
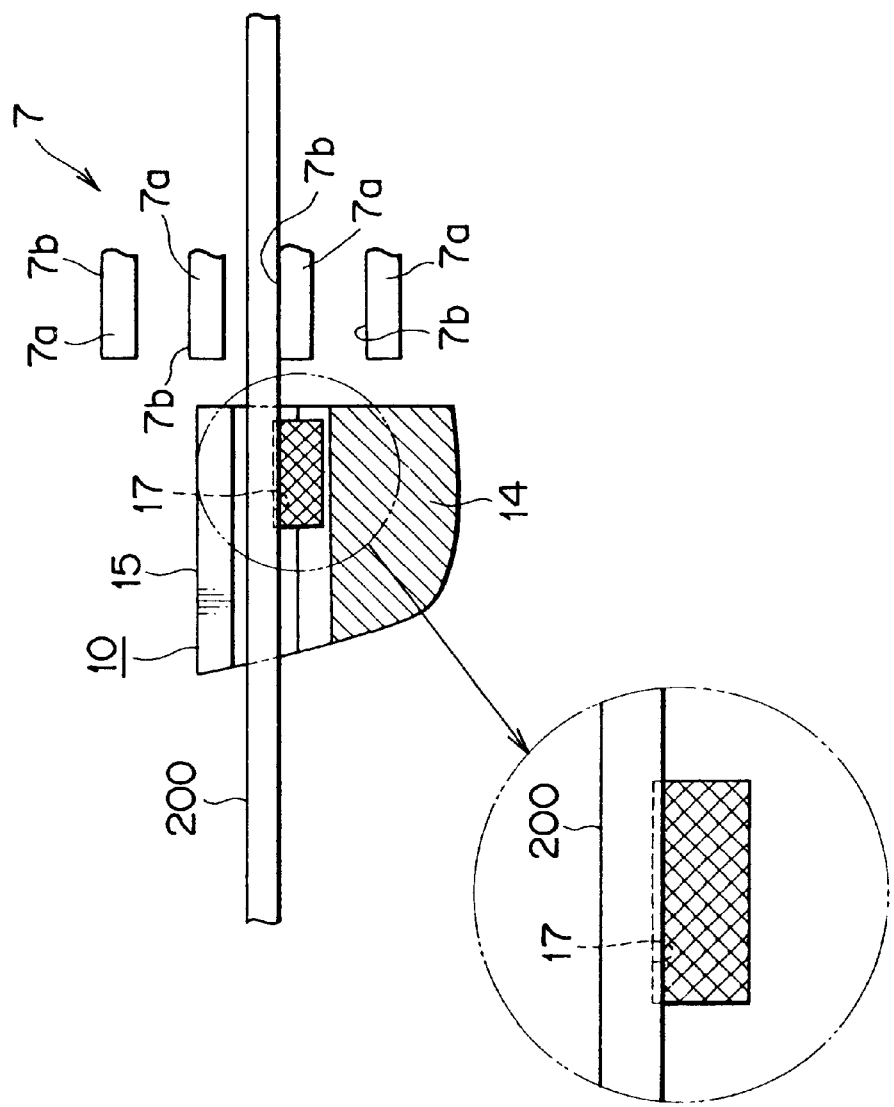
FIG. 15 is a similar view but showing the relationship when the disk carrying section is positioned at a step number n−2.

FIG. 15 illustrates a state wherein the disk carrying section 10 is moved downwardly by one step from the state of FIG. 14. The disk carrying section 10 is at a stop position lower by 2 steps than the optimum stop position and the light intercepting disk 200 is placed on the receiving portions 7b and held in a horizontal state. The state of FIG. 15 corresponds to the step number n−2 of FIG. 18. At this time, the lower face of the light intercepting disk 200 is placed on the receiving portions 7b of the accommodation shelf 7a, and therefore, a gap appears between the light intercepting disk 200 and the disk receiving faces 16a. This gap is greater than that in the case of the step number n−1 because the disk carrying section 10 is moved downwardly from the state of FIG. 14. Accordingly, the light amount measured is greater than that in the case of the step number n−1 shown in FIG. 14.

Figure 16:
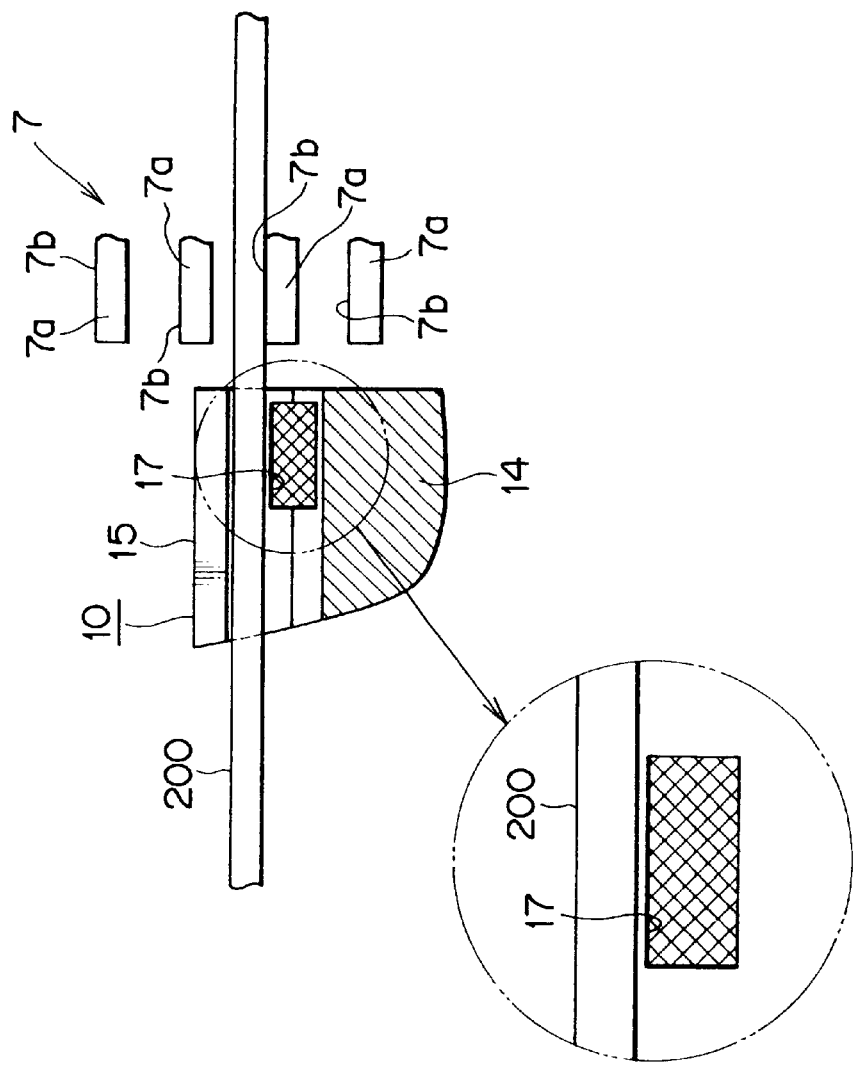
FIG. 16 is a similar view but showing the relationship when the disk carrying section is positioned at a step number n−3.

FIG. 16 illustrates a state wherein the disk carrying section 10 is moved downwardly by one step from the state of FIG. 15. The disk carrying section 10 is at a stop position lower by 3 steps than the optimum stop position and the light intercepting disk 200 is placed on the receiving portions 7b and held in a horizontal state. The state of FIG. 16 corresponds to the step number n−3 of FIG. 18. At this time, the lower face of the light intercepting disk 200 is placed on the receiving portions 7b of the accommodation shelf 7a, and therefore, a gap appears between the light intercepting disk 200 and the disk receiving faces 16a. This gap is greater than that in the case of the step number n−2 because the disk carrying section 10 is moved downwardly from the state of FIG. 15. Accordingly, the light amount measured is greater than that in the case of the step number n−2 shown in FIG. 15.

It is to be noted that, since the light intercepting disk 200 is positioned higher than the upper side opening edges of the passing holes 17 during a process through which the disk carrying section 10 is moved between the step number n−2 and the step number n−3, a conversion point X3 at which the graph line changes from an inclined state to a horizontal state as seen in FIG. 18 appears between the step number n−2 and the step number n−3. This conversion point X3 indicates a point at an instant at which the light intercepting disk 200 is positioned at the same height as the upper side opening edges of the passing holes 17. Further, since the lower face of the light intercepting disk 200 is positioned above the upper side opening edges of the passing holes 17, the measured light amount of the detection light is maximum.

Figure 17:
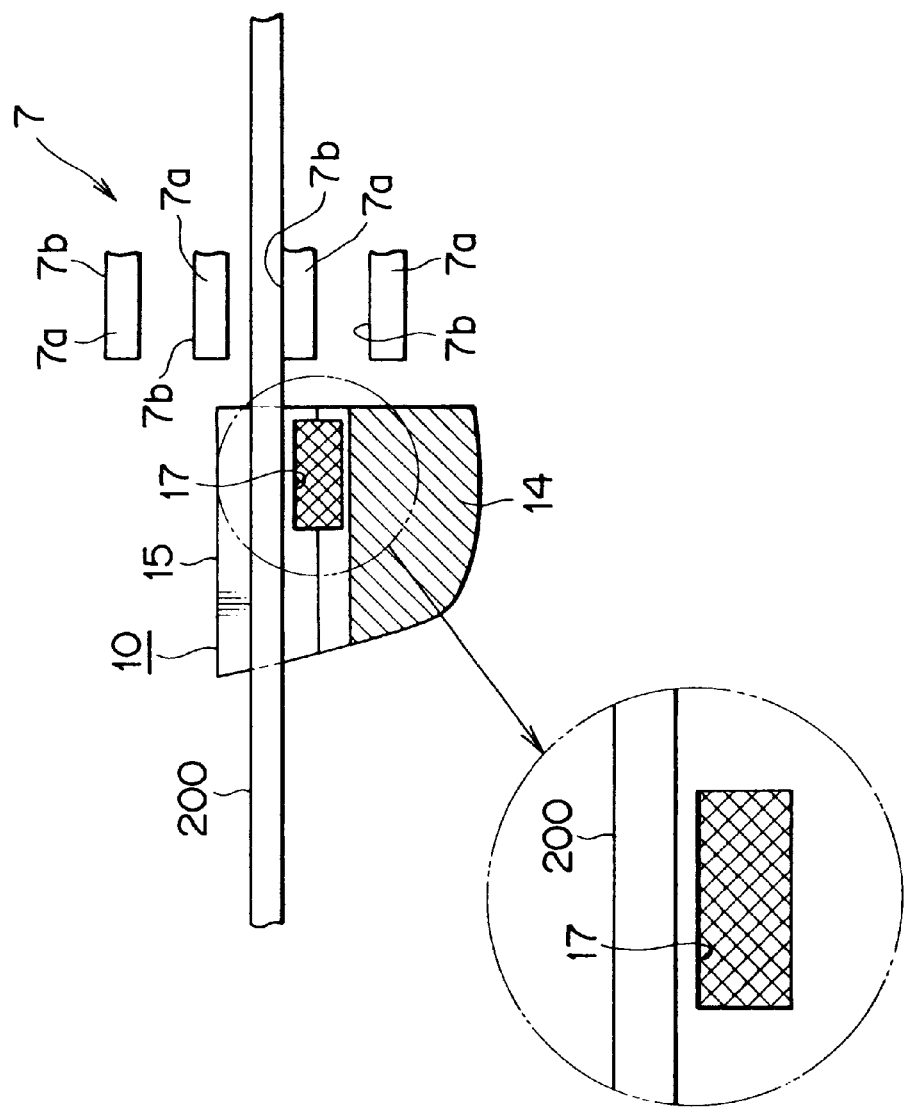
FIG. 17 is a similar view but showing the relationship when the disk carrying section is positioned at a step number n−4.

FIG. 17 illustrates a state wherein the disk carrying section 10 is moved downwardly by one step from the state of FIG. 16. The disk carrying section 10 is at a stop position lower by 4 steps than the optimum stop position and the light intercepting disk 200 is placed on the receiving portions 7b and held in a horizontal state. The state of FIG. 17 corresponds to the step number n−4 of FIG. 18. At this time, the lower face of the light intercepting disk 200 is placed on the receiving portions 7b of the accommodation shelf 7a, and therefore, a gap appears between the light intercepting disk 200 and the disk receiving faces 16a. This gap is greater than that in the case of the step number n−3 because the disk carrying section 10 is moved downwardly from the state of FIG. 16. However, since the lower face of the light intercepting disk 200 is positioned above the upper side opening edges of the passing holes 17, the light amount of the detection light which passes through the passing holes 17 is equal to that in the state of FIG. 16 and maximum, and the measure light amount is equal to that in the case of step number n−2 shown in FIG. 16.

As described above, the light amount measured by the light receiving element 22 exhibits its minimum value between the conversion point X1 and the conversion point X2 and exhibits its maximum value at step numbers smaller than the conversion point X3 (refer to FIG. 18).

Figure 19:
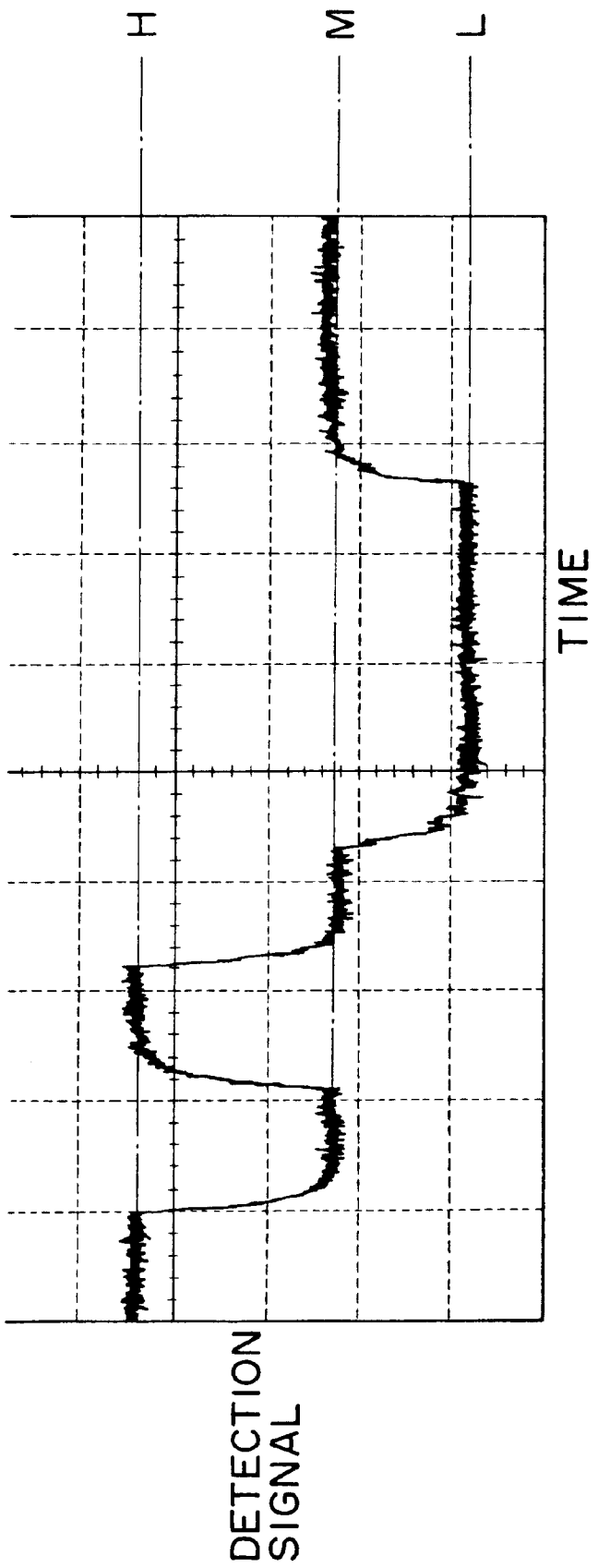
FIG. 19 is a waveform diagram illustrating a waveform of a detection signal of the received light amount with respect to the positional relationship between the disk carrying section and an accommodation shelf.

FIG. 19 is a graph diagram illustrating the detection signal (voltage) representative of the received light amount received by the light receiving element 22 when the relative position between the disk carrying section 10 and the accommodation shelf 7a varies with respect to time. The received light amount is represented as an output amount of the detection signal. In FIG. 19, a portion of the waveform at which the output amount has the highest value H corresponds to the received light amount at a position, for example, at or lower than the step number n−3 shown in FIG. 18. Another portion of the waveform at which the output amount has the lowest value L corresponds to the received light amount at a position, for example, at the step number n+1, n+2 or n+3. A further portion of the waveform at which the output amount has an intermediate value M corresponds to the received light amount at a position, for example, at the step number n, n−1 or n−2. Therefore, the relative position between the disk carrying section 10 and the accommodation shelf 7a can be understood with the detection signal.

Subsequently, positioning adjustment where the disk carrying section 10 is inclined with respect to a disk accommodation section 7 is described with reference to FIGS. 20 to 22.

Usually, the disk carrying section 10 is inclined with respect of the disk accommodation section 7 due to errors in dimension and/or errors in assembly of the components of the disk changer 1. Where the inclination of the disk carrying section 10 is taken into consideration, when one of the disk receiving faces 16a of the receiving portions 16 which is positioned at a higher position is positioned corresponding to the step number n, the position of the disk carrying section 10 is regarded as its optimum stop position.

FIG. 20 illustrates an ideal state wherein the disk carrying section 10 is not inclined with respect to a disk accommodation section 7. In this instance, since both of the disk carrying section 10 and the light intercepting disk 200 at a measurement position which is positioned on an accommodation shelf 7a are in a horizontal state, the areas of those portions of the opening areas of the passing holes 17 positioned at the left and right positions over which light is not intercepted by the light intercepting disk 200 are equal to each other. Accordingly, an image of the light reception side, that is, the received light amount of the light receiving element 22, should be measured.

Figure 22:
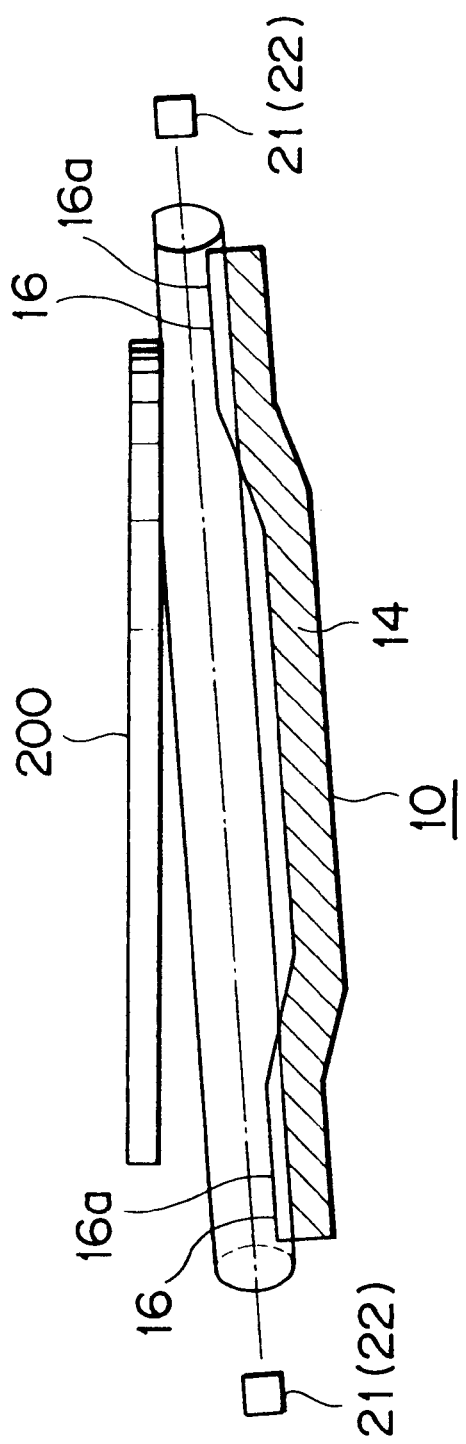
FIG. 22 is a similar view but showing a relationship between the inclination of the disk carrying section and the received light amount when the disk carrying section is inclined and the distance between the light intercepting disk and the disk receiving face is great.

FIGS. 21 and 22 illustrate states wherein the disk carrying section 10 is inclined with respect to a disk accommodation section 7. In particular, FIG. 21 illustrates a case wherein the distance between the disk carrying section 10 and the light intercepting disk 200 is smaller while FIG. 22 illustrates another case wherein the distance between the disk carrying section 10 and the light intercepting disk 200 is greater. In those cases, since the light intercepting disk 200 which is positioned on an accommodation shelf 7a is in a horizontal state and the disk carrying section 10 is in an inclined state, the areas of those portions of the opening areas of the passing holes 17 over which light is not intercepted by the light intercepting disk 200 are different from each other consequently, the light amount of the detection light is restricted by the passing hole 17 of that one of the disk receiving faces 16a which is positioned at a higher position. Even where the disk carrying section 10 is inclined in this manner, if the light amount of the detection light restricted by the passing hole 17 of one of the disk receiving faces 16a which is positioned at a higher position and received by the light receiving element 22 is measured, then the position of the disk carrying section 10 with respect to the accommodation shelf 7a is detected.

Accordingly, irrespective of whether or not the disk carrying section 10 is inclined, if an image of the light reception side, that is, the received light amount of the light receiving element 22, is measured, then positioning adjustment of the disk carrying section 10 with respect to each of the accommodation shelves 7a can be performed accurately.

Upon the positioning adjustment, the received light amount of the detection light emitted from the light emitting element 21 and received by the light receiving element 22 through the passing holes 17 is detected. The first passing grooves 16c positioned below the disk receiving faces 16a are formed on the receiving portions 16 of the disk carrying section 10 so that, even if the detection light is intercepted by the light intercepting disk 200, a received light amount greater than a fixed amount may always be measured. The reason is described with reference to a graph of FIG. 23.

Figure 23:
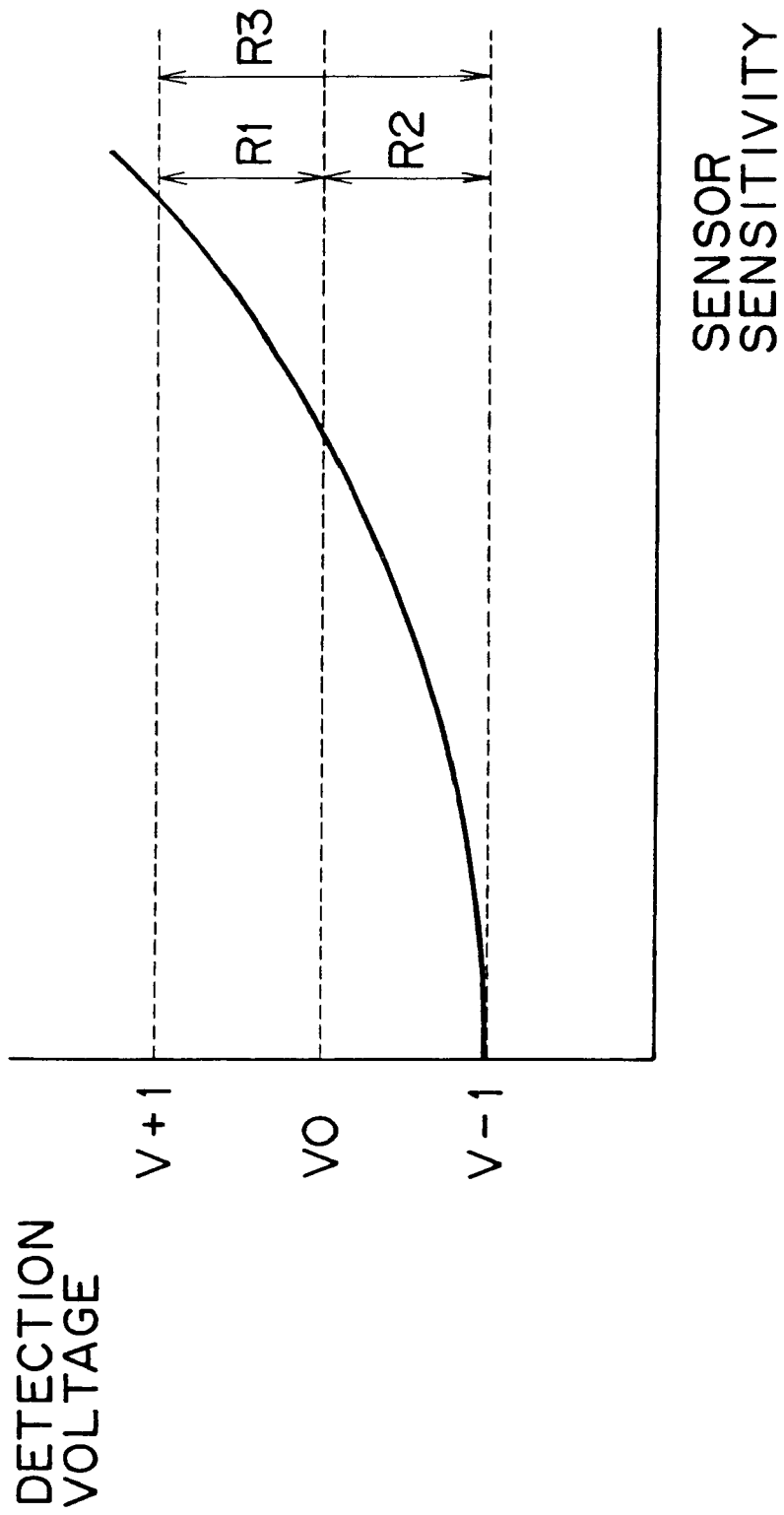
FIG. 23 is a graph illustrating a relationship between the detection voltage and the sensor sensitivity.

FIG. 23 is a graph illustrating a relationship between the detection voltage generated upon detection of detection light and the sensor sensitivity. As seen in FIG. 23, the relationship between them is represented as an exponential function wherein the sensor sensitivity increases as the detection voltage increases. If only the second passing grooves 15c are formed without forming the first passing grooves 16c, then since the light amount measured is small, a detection voltage is measured within a range R1. However, if also the first passing grooves 16c are formed, then since the light amount measured increases, the detection voltage is measured also within a range R2. Accordingly, it is possible to measure the detection voltage within a range R3 which is the sum of the ranges R1 and R2.

Accordingly, where the first passing grooves 16c are formed, even when the detection light is intercepted by the light intercepting disk 200, a received light amount greater than a fixed amount is always measured. Therefore, the detection voltage of the light receiving element 22 is measured within the range R3, and the resolution can be set over a wider range as much and augmentation of the adjustment accuracy in positioning adjustment can be anticipated.

Figure 24:
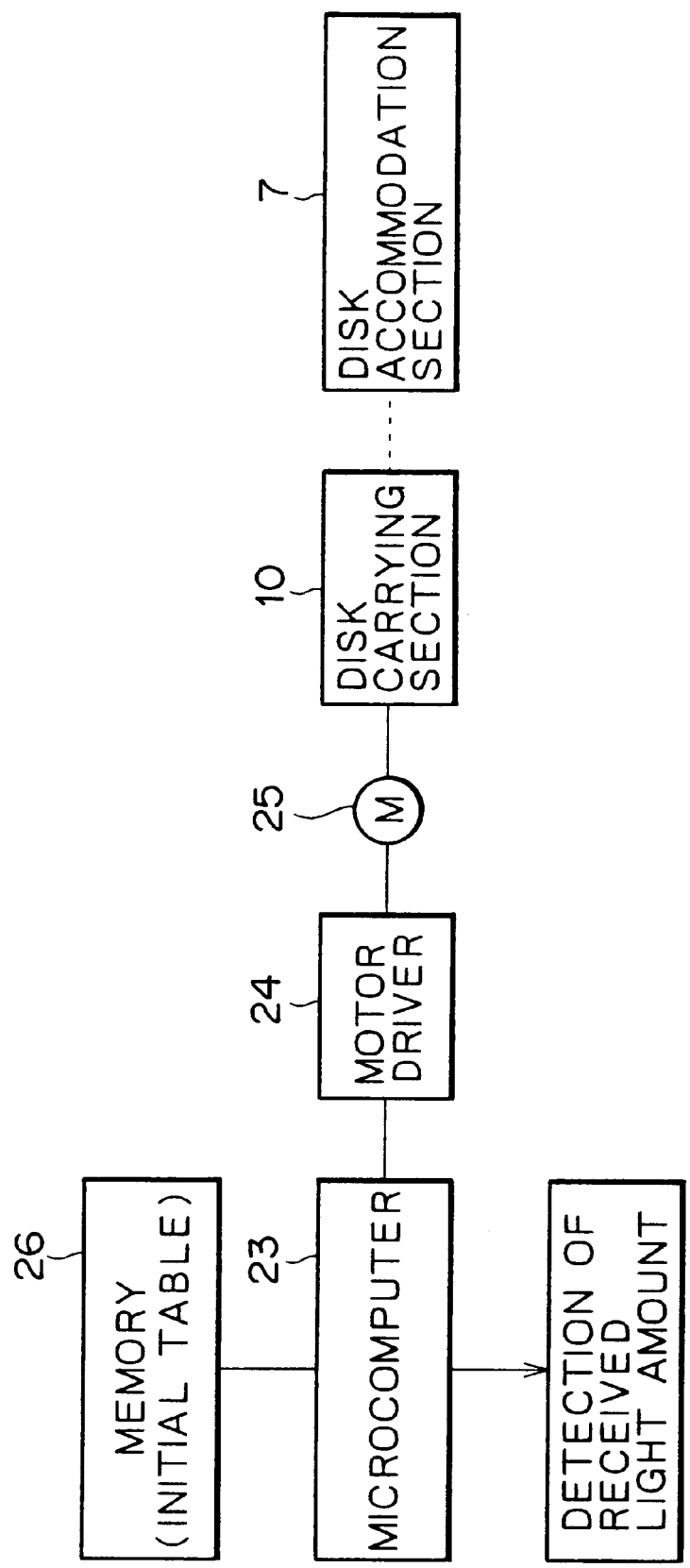
FIG. 24 is a block diagram showing a principal construction of the disk changer.

Subsequently, a principal construction of the disk changer 1 for performing positioning adjustment is described with reference to a block diagram shown in FIG. 24.

A microcomputer 23 is incorporated in the disk changer 1, and various instruction signals such as, for example, a signal for starting or stopping driving of a stepping motor 25 through a motor driver 24 and so forth are signaled from the microcomputer 23. Further, a signal including position information of an optimum stop position of the disk carrying section 10 with respect to each of the accommodation shelves 7a is signaled from the microcomputer 23. Consequently, data of the designed optimum stop positions of the disk carrying section 10 written in the initial table of a memory 26 are updated. Accordingly, the memory 26 has a function as storage means for storing position information of the disk carrying section 10 with respect to the origin position.

Subsequently, a procedure of positioning adjustment of the disk carrying section 10 with respect to each of the accommodation shelves 7a is described with reference to a flowchart shown in FIG. 25.

If positioning adjustment becomes required, a user will insert the light intercepting disk 200 from the insertion/removal section 6 and moves the disk carrying section 10 to the top end of the range of movement so that the light intercepting disk 200 inserted is drawn in and held by the picking portion 12.

In step S1, the received light amount by the light receiving element 22 in a state wherein the detection light is not intercepted by the light intercepting disk 200 is stored. The reason why the received light amount in a state wherein the detection light is not intercepted by the light intercepting disk 200 is stored in this manner is that it is intended to store the maximum value of the detection amount so that, even if an output higher than an estimated level appears, for example, due to a failure of the detection function of the received light amount or the like, erroneous detection may not be caused by such increase of the output. Accordingly, if a received light amount greater than the stored received light amount is measured in the following measurement of the received light amount, then positioning adjustment is performed with the measured received light amount replaced with the stored received light amount.

In step S2, the disk carrying section 10 on which the light intercepting disk 200 is held is moved downwardly until the top end 5a of the light intercepting plate 5 is detected by the photo-interrupter 18 provided on the disk carrying section 10 thereby to detect the origin position. After the origin position is detected, the disk carrying section 10 is moved upwardly by a predetermined step number to a first stop position for an accommodation shelf 7a for which positioning adjustment is required based on a pertaining value of the initial tables of the memory 26. It is to be noted that the pertaining value of the initial table signifies a value determined upon designing or, if positioning adjustment has been performed already, the updated value.

Figure 3:
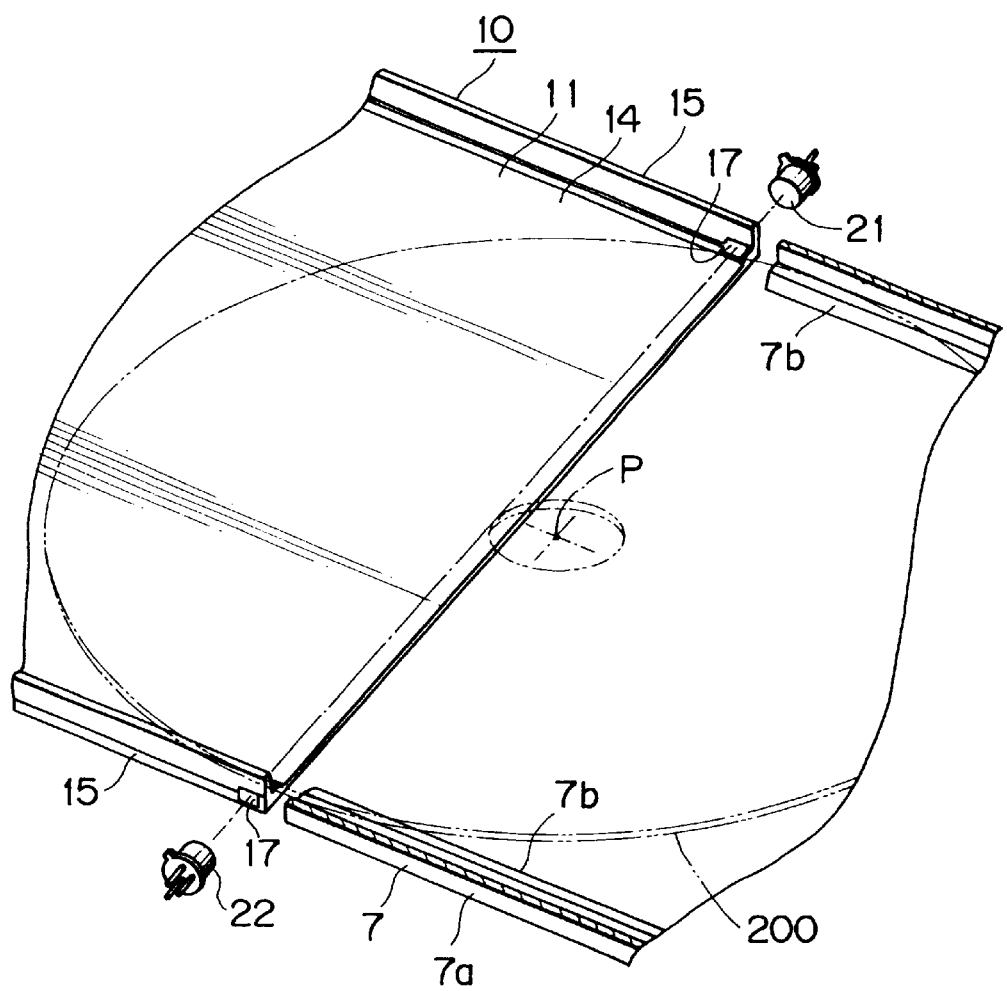
FIG. 3 is a schematic enlarged perspective view showing a light intercepting disk at a measurement position.
Figure 4:
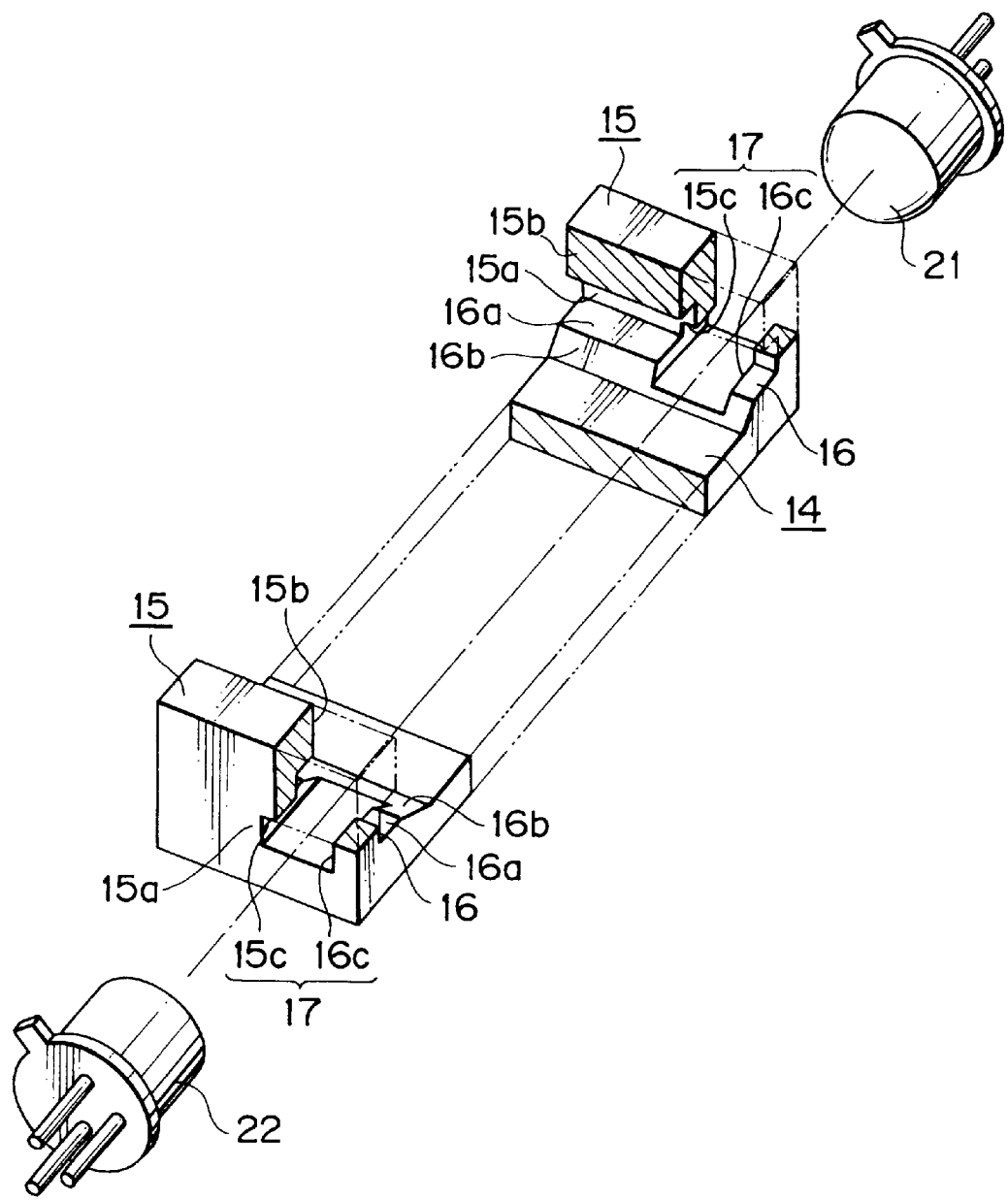
FIG. 4 is an enlarged exploded perspective view showing, partially in section, part of the disk carrying section.
Figure 5:
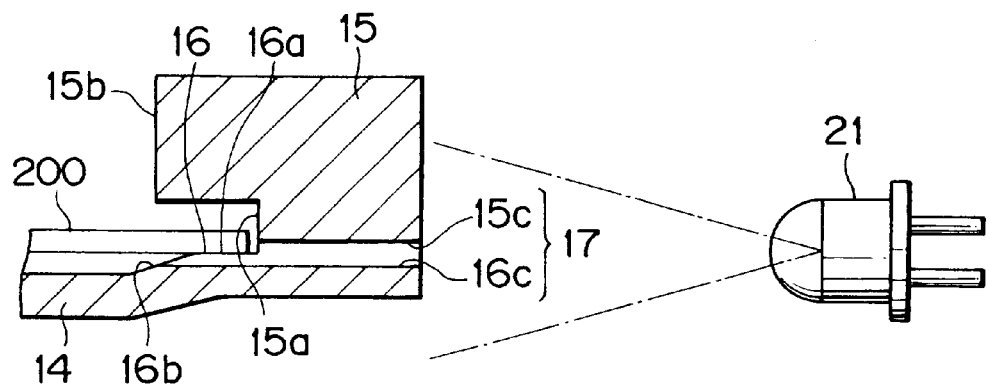
FIGS. 5 and 6 are schematic enlarged front elevational sectional views showing a relationship between a light emitting element and a passing hole.
Figure 6:
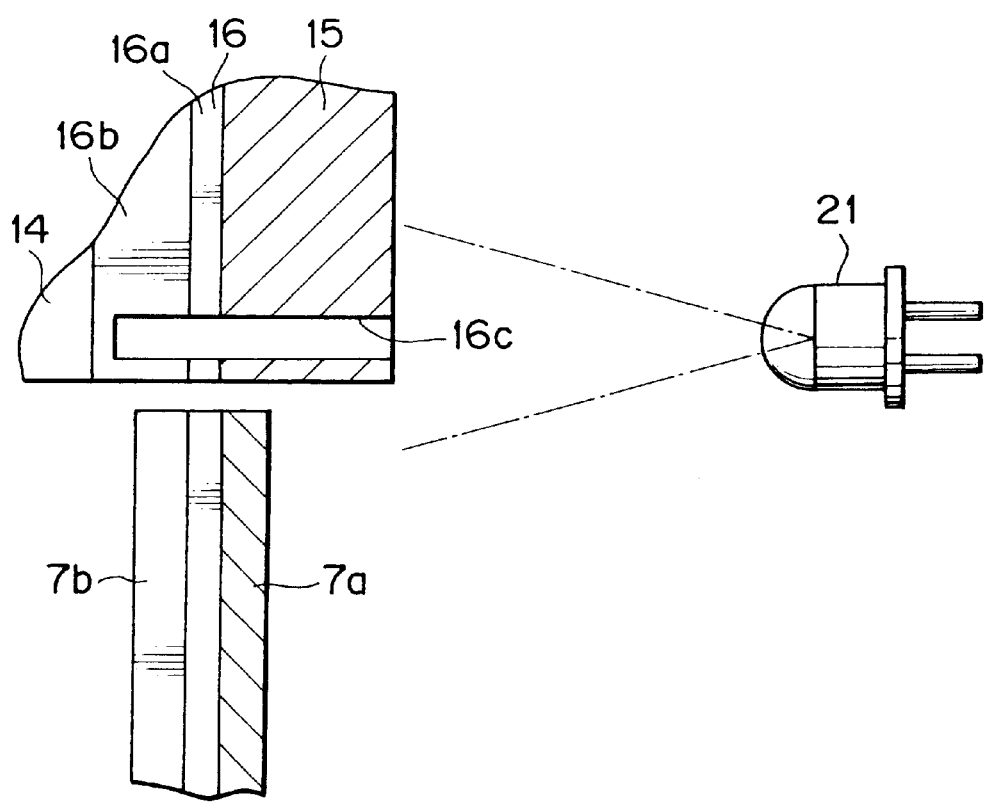

In step S3, after the disk carrying section 10 is stopped at the first position, the picking portion 12 is moved forwardly to a measurement position which is a position at which the light intercepting disk 200 held by the picking portion 12 is positioned on the accommodation shelf 7a, that is, a position at which the center P of the light intercepting disk 200 corresponds to a rear end portion of the accommodation shelf 7a (refer to FIG. 3). Then, the holding of the light intercepting disk 200 by the picking portion 12 is cancelled, and the picking portion 12 is moved backwardly to a position in which it does not interfere with the light intercepting disk 200.

In step S4, detection light is irradiated from the light emitting element 21 toward the light receiving element 22 through the passing holes 17 to measure the light reception amount A at the measurement position.

In step S5, the disk carrying section 10 is moved down by one step. If the first stop position is, for example, the position of the step number n, then the disk carrying section 10 is moved to the position of the step number n−1, but if the first stop position is the position of the step number n+3, then the disk carrying section 10 is moved to the position of the step number n+2. The position after the downward movement by one step is a second stop position.

In step S6, the light reception amount B is measured at the second stop position after the downward movement of the disk carrying section 10 by one step.

In step S7, the state of variation in measurement value between the light reception amount A and the light reception amount B is discriminated. It is to be noted that, in the discrimination of the state of variation in measurement value, taking the detection accuracy of the detection function, the accuracy of the stop position of the disk carrying section 10 and so forth, into consideration, a certain threshold value is set, and if the variation remains within the certain threshold value, then it is determined that the measurement value is "free from variation", but if the variation amount exceeds the threshold value, then it is discriminated that the variation of the measurement value exhibits an "increase" or a; "decrease". The discrimination with the threshold value provided in this manner similarly applies to discrimination of the variation in measurement value described below.

If it is discriminated that the received light amount A<received light amount B, then it is considered that the second stop position is a position on the left side of the conversion point X2 shown in FIG. 18 and usually is the position of the step number n, n−1, n−2 or n−3. In this instance, the processing advances to step S8, in which the disk carrying section 10 is moved upwardly.

On the other hand, if it is discriminated in step S7 that the received light amount A≧received light amount B, then it is considered that the second stop position is a position on the right side of the conversion point X2 shown in FIG. 18 and usually is the position of the step number n+1, n+2, n+3 or n+4. In this instance, the processing advances to step S9, in which the disk carrying section 10 is further moved downwardly.

Accordingly, a third stop position to which the disk carrying section 10 is to be moved subsequently is determined by comparison between the received light amount A at the first stop position and the received light amount B at the second stop position of the disk carrying section 10.

In step S8, it is determined based on a result of the discrimination of variation in measurement value in step S7 that the disk carrying section 10 should be moved upwardly.

On the other hand, in step S9, it is determined based on a result of the discrimination of variation in measurement value in step S7 that the disk carrying section 10 should be moved downwardly.

In step S10 to which the processing advances from step S8 or S9, the disk carrying section 10 is moved upwardly or downwardly by one step to the third stop position based on the determination in step S8 or S9.

In step S11, the received light amount is measured at the position after the upward or downward movement by one step.

In step S12, the state of variation between the measurement value at the position after moved upwardly or downwardly by one step and the measurement value before such upward or downward movement is discriminated. When the disk carrying section 10 is moved upwardly, if it is discriminated that the measurement value is "free from variation", then the processing advances to step S15, but if, it is discriminated that the variation of the measurement value is an "increase" or a"decrease", then the processing advances to step S13. On the other hand, when the disk carrying section 10 is moved downwardly, if it is discriminated that the variation of the measurement value is an "increase", then the processing advances to step S15, but if it is discriminated that the measurement value exhibits "no variation" or a variation of a "decrease", then the processing advances to step S13.

If it is discriminated that the measurement value is "free from variation" in the process of upward movement of the disk carrying section 10, then it is considered that the disk carrying section 10 is moved from the step number n+1 to the step number n+2 shown in FIG. 18. On the other hand, if it is discriminated that the measurement value exhibits a variation of an "increase" in the process of downward movement of the disk carrying section 10, then the disk carrying section 10 is moved from the step number n+1 to the step number n shown in FIG. 18.

In step S13, it is discriminated whether or not the disk carrying section 10 has been moved by 4 steps. If the movement has been performed but by 3 steps of less, then the processing advances to step S10 again, and the processing from step S10 to step S13 is repetitively performed until the discrimination result for advancement to step S15 described above is obtained in step S12. In contrast, if the disk carrying section 10 has been moved by four steps, then the processing advances to step S14.

The reason why it is discriminated that the movement by four steps has been performed is that it is intended to limit the number of times of repetition of the procedure from step S10 to step S12 so that, for example, when a failure occurs with the detection function, the procedure may be prevented from being repeated infinitely. It is to be noted that the number of steps of four is a mere example and the limit number of times can be selected arbitrarily in accordance with the discrimination environment, the accuracy of the apparatus and so forth.

In step S14, since the movement has been performed by four steps, the disk carrying section 10 enters a retry mode for positioning adjustment and thus advances the processing to step S3 so that the procedure beginning with step S3 described above is performed again.

In step S15, the direction of movement of the disk carrying section 10 is reversed such that, if it has been moved upwardly, then it is moved downwardly, but if it has been moved downwardly, then it is moved upwardly. The reverse movement of the disk carrying section 10 is performed, for example, by two steps, and in the process of the stepwise downward movement of the disk carrying section 10, the received light amount is measured at the stop position of each step number and it is confirmed and discriminated whether or not the downward movement by two steps is the movement of the step number n+2→step number n+1→step number n. Or else, in the process of the stepwise upward movement of the disk carrying section 10 by two steps, the received light amount is measured at the stop position of each step number and it is confirmed and discriminated whether or not the upward movement by two steps is the movement of the step number n→step number n+1→step number n+2.

In step S16, it is discriminated whether or not the confirmation discrimination is completed with the two steps. If the confirmation discrimination is not completed with the two steps, then the processing advances to step S10 so that the procedure beginning with step S10 is performed again. It is to be noted that the number of steps of two is a mere example and the limit number of times to the confirmation discrimination can be selected arbitrarily in accordance with the discrimination environment, the accuracy of the apparatus and so forth.

In step S17, if the confirmation discrimination has been performed after the downward movement of the disk carrying section 10, then since the position after the downward movement by two steps is the position of the step number n, the position after the downward movement by two steps is determined as an optimumi stop position of the disk carrying section 10 with respect to the accommodation shelf 7a. However, if the confirmation discrimination has been performed after the upward movement of the disk carrying section 10, then since the position before the upward movement by two steps is the step number n, the position before the upward movement by two steps is determined as an optimum stop position of the disk carrying section 10 with respect to the accommodation shelf 7a.

The optimum stop positions of the disk carrying section 10 with respect to the accommodation shelves 7a for which positioning adjustment is required are determined in such a manner as described above and stored into the memory 26 by the microcomputer 23 to update the values of the initial table. It is to be noted that the storage of the optimum stop positions into the memory 26 may be storage of absolute values from the origin position of the disk carrying section 10 or storage of displacement amounts from the designed values of the initial table.

After the positioning adjustment is completed, the light intercepting disk 200 is held by the picking portion 12 of the disk carrying section 10 again, and the disk carrying section 10 is moved to the upper end of the range of movement. Thereafter, the picking portion 12 is advanced and the light intercepting disk 200 is released from the disk changer 1, thereby placing the light intercepting disk 200 into a state wherein it can be discharged from the insertion/removal section 6.

Then, upon actual operation wherein the disk-type recording media 100 are transferred between the disk carrying section 10 and the accommodation shelves 7a, the values of the optimum stop positions stored and updated in the memory 26 are read out. Then, the disk carrying section 10 is stopped at the optimum stop positions with respect to the accommodation shelves 7a to effect appropriate transfer of the disk-type recording media 100.

As described above, in the disk changer 1, an optimum stop position of the disk carrying section 10 with respect to each accommodation shelf 7a is detected based on the received light amount of the detection light emitted from the light emitting element 21 which is received by the light receiving element 22 without being intercepted by the light intercepting disk 200 and a result of the detection is stored into the memory 26. Consequently, positioning adjustment for setting the optimum position of the disk carrying section 10 with respect to an accommodation shelf 7a can be performed at a low cost with a small number of parts without the necessity to use expensive detection means, for example, a measuring instrument such as a CCD camera or an oscilloscope.

Further, since the disk changer 1 can perform the positioning adjustment independently for each of the accommodation shelves 7a, the reliability of the positioning adjustment can be augmented.

Furthermore, since, upon positioning adjustment, the disk changer 1 detects the stop position of the disk carrying section 10 in a state wherein the center of gravity of the light intercepting disk 200 is positioned on a disk accommodation section 7, that is, in a measurement position in which the light intercepting disk 200 is positioned on the accommodation shelf 7a, detection of a stop position can be performed with certainty and further augmentation of the reliability in detection of an optimum stop position can be anticipated.

Besides, in the disk changer 1, since, upon positioning adjustment, the variation of the light amount of the detection light passing through the gap between the light intercepting disk 200 and the disk receiving faces 16a which varies depending upon the stop position of the disk carrying section 10 is measured to detect the optimum stop position of the disk carrying section 10, detection of the optimum stop position can be performed very readily.

In addition, since, in positioning adjustment, the disk carrying section 10 is moved upwardly and the stop position of the disk carrying section 10 with respect to an accommodation shelf 7a is varied to detect position information of the individual stop positions, detection of the optimum stop position can be performed accurately when compared with an alternative case wherein, for example, an actual displacement amount is detected by calculation with reference to a designed value to set an optimum stop position.

It is to be noted that, while, in the procedure of positioning adjustment described above, the disk carrying section 10 is normally moved down by one step after the received light amount A is measured in step S5 illustrated in FIG. 25, where the disk carrying section 10 is moved always in one direction in this manner, the procedure is simple and a malfunction is prevented. Further, since also control by the microcomputer 23 is easy, also reduction of the adjustment time can be anticipated.

While the foregoing description relates to a case wherein the light intercepting disk 200 is used in positioning adjustment, for example, in a disk changer or the like wherein a disk-type recording medium which is accommodated for rotation in a case body is used, if the case body intercepts light, then the disk-type recording medium may be used in place of the light intercepting disk 200 to intercept detection light irradiated from the light emitting element 21 to detect an optimum stop position.

Further, the positioning adjustment described above can be performed also on a disk changer of the so-called vertical type. It is to be noted that, in this instance, a mechanism for causing the light intercepting disk 200 to be positioned on an accommodation shelf at a measurement position is provided preferably.

It is to be noted that the specific shapes and structures of the components in the embodiment described above are a mere example of embodiment when the present invention is carried out, and the technical scope of the present invention shall not be interpreted restrictively by them.

What is claimed is:

1. A disk carrying apparatus, comprising:
   a disk carrying section for carrying a disk-type recording medium;
   a disk accommodation section including a plurality of layered accommodation shelves for accommodating the disk-type recording medium carried by said disk carrying section into one of said accommodation shelves;
   a storage section for storing position information of said disk carrying section with respect to said accommodation shelves of said disk accommodation section;
   control means for controlling said disk carrying section in accordance with the position information stored in said storage section to move to a position corresponding to each of said accommodation shelves;
   stopping state detection means, including a light emitting element and a light receiving element provided on said disk carrying section adjacent said disk accommodation section, for detecting a stopping state of said disk carrying section with respect to each of said accommodation shelves, based on a received light amount of said light receiving element depending on a state of a light intercepting disk that is transferred between said disk carrying section and the accommodation shelf; and
   updating means for determining an optimum stop position of said disk carrying section with respect to each of said accommodation shelves in response to the stopping state detected by said stopping state detection means and updating the position information stored in said storage section with the position information corresponding to the optimum stop position.

2. A disk carrying apparatus according to claim 1, wherein said stopping state detection means detects the stopping state of said disk carrying section in a state wherein the center of gravity of the light intercepting disk is positioned in the accommodation shelf after the light intercepting disk is moved from said disk carrying section to said disk accommodation section.

3. A disk carrying apparatus according to claim 2, further comprising a disk supporting section for supporting the light intercepting disk moved from said disk carrying section to said disk accommodation section, and wherein said disk supporting section has a passing hole, formed therein for light from said light emitting element to said light receiving element and said stopping state detection means detects the stopping state of said disk carrying section from rays of light emitted from said light emitting element and received by said light receiving element through a space defined by the light intercepting disk and said passing hole.

4. A disk carrying apparatus according to claim 1, wherein said control means controls said disk carrying section to move to a plurality of stop positions with respect to a predetermined one of said accommodation shelves and said stopping state detection means detects the stopping state for each of the plurality of stop positions, and said updating means determines an optimum stop position of said disk carrying section with respect to the accommodation shelf in response to the detected stop positions and updates the position information for the accommodation shelf stored in said storage section with the position information corresponding to the optimum stop position.

5. A disk carrying apparatus according to claim 4, wherein said control means controls said disk carrying section to move to a second stop position in a particular direction after the stopping state when said disk carrying section is at a first stop position corresponding to the position information for the predetermined accommodation shelf stored in said storage section is detected, and said stopping state detection means acquires a first detection result of a voltage based on the received light amount of said light receiving element corresponding to the first stop position and a second detection result of a voltage based on the received light amount of said light receiving element corresponding to the second stop position, and then said control means determines a direction of movement of said disk carrying section to a third stop position in response to a variation from the first detection result to the second detection result and controls the movement of said disk carrying section.

6. A disk carrying apparatus according to claim 1, further comprising an insertion/removal section for inserting/removing the disk-type recording medium into/from said disk carrying apparatus, and wherein said disk carrying section carries the disk-type recording medium inserted from said insertion/removal section.

7. A disk carrying apparatus according to claim 1, further comprising a playback section for playing back information stored on the disk-type recording medium carried by said disk carrying section.

8. A disk carrying apparatus according to claim 7, further comprising a storage section for recording information onto the disk-type recording medium carried by said disk carrying section.

9. A disk carrying method, comprising:

moving a disk carrying section to a stop position opposing to one of a plurality of accommodation shelves layered in a disk accommodation section;

moving a light intercepting disk carried by said disk carrying section to the accommodation shelf;

measuring, using a light emitting element and a light receiving element provided on said disk carrying section in an opposing relationship to each other across the light intercepting disk, a received light amount of said light receiving element depending on a state of the light intercepting disk that is transferred between said disk carrying section and said accommodation shelf; and determining an optimum stop position of said disk carrying section with respect to the accommodation shelf in accordance with the received light amount.

10. A disk carrying method according to claim 9, further comprising a step of reading out, from a storage section in which position information for said plurality of accommodation shelves is stored, the position information for the accommodation shelf, and wherein the step of moving said disk carrying section to the stop position moves said disk carrying section to a first stop position opposing to the accommodation shelf in accordance with the read out position information.

11. A disk carrying method according to claim 9, wherein, in the step of moving the light intercepting disk to the accommodation shelf, the center of gravity of the light intercepting disk being moved is positioned on the accommodation shelf side.

12. A disk carrying method according to claim 10, wherein the step of measuring the received light amount of said light receiving element measures the received light amount of said light receiving element at the first stop position, and further comprising the steps of moving said disk carrying section to a second stop position in a direction determined in advance from the first stop position, and measuring the received light amount of said light receiving element at the second stop position.

13. A disk carrying method according to claim 12, further comprising the steps of:

moving said disk carrying section to a third stop position positioned in a carrying direction determined based on the received light amounts at the first and second stop positions;

measuring the received light amount of said light receiving element at the third stop position; and moving said disk carrying section in a direction opposite to the carrying direction in response to a variation from the received light amount at the second stop position to the received light amount at the third stop position.

14. A disk carrying method according to claim 13, further comprising the steps of:

measuring the received light amount of said light receiving element at the second stop position again;

measuring the received light amount of said light receiving element at the first stop position again;

the step of determining an optimum stop position of said disk carrying section determining the optimum stop position in response to variations among the received light amounts in the first, second and third stop positions; and updating the position information for the accommodation shelf stored in said storage section with the position information for the optimum stop position.

* * * * *